Oct. 7, 1969 M. M. BECKA ET AL 3,470,573

METHOD AND APPARATUS FOR FABRICATING SHOES

Filed May 9, 1966 16 Sheets-Sheet 1

INVENTOR.
Allen C. Harriman
BY Michael M. Becka
Albert Gordon ATT'Y

Oct. 7, 1969 M. M. BECKA ET AL 3,470,573

METHOD AND APPARATUS FOR FABRICATING SHOES

Filed May 9, 1966 16 Sheets-Sheet 2

Oct. 7, 1969 M. M. BECKA ET AL 3,470,573

METHOD AND APPARATUS FOR FABRICATING SHOES

Filed May 9, 1966 16 Sheets-Sheet 3

Oct. 7, 1969 M. M. BECKA ET AL 3,470,573

METHOD AND APPARATUS FOR FABRICATING SHOES

Filed May 9, 1966 16 Sheets-Sheet

Oct. 7, 1969 M. M. BECKA ET AL 3,470,573

METHOD AND APPARATUS FOR FABRICATING SHOES

Filed May 9, 1966 16 Sheets-Sheet 7

Oct. 7, 1969 M. M. BECKA ET AL 3,470,573

METHOD AND APPARATUS FOR FABRICATING SHOES

Filed May 9, 1966 16 Sheets-Sheet 8

Oct. 7, 1969 M. M. BECKA ET AL 3,470,573

METHOD AND APPARATUS FOR FABRICATING SHOES

Filed May 9, 1966 16 Sheets-Sheet 16

United States Patent Office 3,470,573

Patented Oct. 7, 1969

3,470,573

METHOD AND APPARATUS FOR FABRICATING SHOES

Michael M. Becka, Cambridge, and Allen C. Harriman, Brockton, Mass., assignors to Jacob S. Kamborian, West Newton, Mass.

Filed May 9, 1966, Ser. No. 548,446
Int. Cl. B32b *31/00;* A43d *9/00, 11/00*
U.S. Cl. 12—142 44 Claims

ABSTRACT OF THE DISCLOSURE

The instant disclosure is concerned with a method and apparatus for taping an insole to the bottom of the last in preparation for subsequent shoemaking operations in such a manner that the tape may thereafter be readily removed. The apparatus includes a support for a last and means for locating an insole on the bottom of the last in registry therewith. A tape strip fabricating unit is provided and serves to sever tape strips of predetermined length from a roll thereof and thereafter render the ends of the tape strips non-adhesive by applying a paper backing strip to the adhesive surface of each end of each tape strip. Mechanism is provided for applying the tape strips transversely to the bottom of the insole so that the laterally extending ends of each tape strip may be pressed into adhesion with the sides of the last, the non-adhesive extremities of each tape strip serving as peel tabs to facilitate the removal of each of the tape strips from the last and insole assembly. Means are further provided for firmly pressing the tape strips and insole to the bottom of the last to simultaneously cause the tape strips to adhere thereto and to deform the insole to the contour of the bottom of the last.

The subject of the instant invention is directed towards a method and apparatus for fabricating shoes and more particularly to a method and apparatus for detachably taping an insole to the bottom of a last in preparation for subsequent shoemaking operations.

One aspect of the invention resides in applying a tape strip of special construction transversely to the breastline and ballbreak portions of a last having an insole located in alignment on the bottom thereof. Each of the tape strips has an adhesive midportion and non-adhesive tabs formed at its ends, the adhesive midportion being of a length sufficient to adhere transversely to the bottom of the insole and the sides of the last. Such a tape strip is applied transversely to the bottom of the insole, preferably at both the ballbreak and breastline regions, and then the ends of the tape strip are pressed into adhesion with the sides of the last, the non-adhesive tabs remaining free of the sides of the last, thus securing the insole to the last. The tabs are then folded back against the tape strip so that they may extend beyond the bottom of the insole. With the tabs in this position a shoe upper may be draped about the assembled last and insole, taking care that the tabs continue to extend beyond the insole bottom, and may be lasted at the heel and toe ends thereof, the portion of the shoe assembly that includes and is contained between the tape strips remaining unlasted so as to permit the removal of the tape strips. Such removal is effected by simply gripping the tabs and pulling them away from the insole bottom and may be done after the aforementioned partial lasting operation. Once the heel and toe ends of the shoe have been lasted the insole will remain in proper alignment on the last bottom without the aid of the tape strips. Upon removal of the tape strips the unlasted portion of the shoe assembly may be lasted and the shoe may be finished by conventional methods.

Another aspect of the invention includes an apparatus for aligning the last and insole and applying the aforesaid tape strips thereto. The apparatus includes a last supporting device, mounted on a frame, which is adapted to support a last at the heel and toe ends thereof and in a bottom-up position. Incorporated into the last supporting device are a number of deflecting members which are adapted to embrace and engage the last at the bottom peripheral portion thereof and are so mounted as to be moveable towards and away from the last so as to alternatively be in engagement or disengagement therewith. Each of the deflecting members has a portion thereof extending upwardly beyond the bottom of the last. Thus when a last having an insole loosely located in general alignment on the bottom thereof is placed in the last supporting device, movement of the deflecting members towards the last may cause the upwardly extending portions of the deflecting members to engage the peripheral edge of any misaligned portions of the insole and subsequently cause those misaligned portions to be displaced into alignment with the bottom periphery of the last in response to continued movement of the deflecting members towards and into engagement with the last. When the last and insole have been engaged by all the deflecting members, such engagement is maintained to rigidly support the last and insole therebetween.

Another aspect of the invention is concerned with an apparatus for applying the tape strips to the shoe assembly and, at substantially the same time, pressing the insole to the bottom of the last so as to cause the insole to be deformably molded to the contour of the bottom of the last. A plurality of pressing members are supported within the frame above and for heightwise movement which is towards and away from the bottom of the shoe assembly. The pressing members are constructed so as to be capable of a limited amount of universal movement so that when brought to bear against the bottom of the shoe assembly they may adapt themselves to the contour of the last bottom and thus press the insole into conforming contour therewith. The tape strips are supported transversely of and above the breastline and ballbreak portions of the shoe assembly but at an elevation which is below that of the pressing members by means of tape guides which are mounted to the apparatus so as to be moveable in a heightwise direction in unison with the pressing members. A pair of tape guides are provided for each of the tape strips, the tape guides of each pair being spaced laterally and on opposed sides of the shoe assembly so that each tape strip may be suspended by its ends in its associated tape guides such that the adhesive midportion of the tape strip is spaced above and is transverse of the shoe assembly.

With the last and insole aligned and supported in the last supporting device, the pressing members and tape guides may be moved in unison downwardly towards the bottom of the shoe assembly to thus bring the adhesive midportion of each tape strip to bear against the bottom of the insole. Once such contact of the tape strip and insole has been established the tape strip is precluded from further downward movement so that as the pressing members are moved downwardly into engagement with the insole bottom, the tape guides, continually moving downwardly in unison therewith, may release and be withdrawn from the ends of their associated tape strips, the tape guides being so constructed as to perform this releasing function. The pressing members then bear against the insole bottom to press the tape strips into firm adhesion therewith and to deformably mold the insole to the contour of the bottom of the last. While the pressing members are in pressing engagement with the bottom of the shoe assembly the unadhered adhesive portion of the ends of the tape strips are caused to be pressed into adhesion with the sides of the last by means of a number of flexible pressing fingers which are mounted with respect to the pressing members for downward movement in unison therewith, thus bringing the pressing fingers into a position spaced from but adjacent to the shoe assembly. The pressing fingers are also mounted for movement which is independent of the pressing members, there being a guide mechanism associated with the pressing fingers so as to guide their independent movement in a prescribed path. The guide mechanism is effective to cause each of the pressing fingers to move from its adjacently spaced position towards the shoe assembly such that it engages its associated tape strip end at the bottom periphery of the last and subsequently moves downwardly along the side of the last to press the tape strip end thereto, the non-adhesive tab portion of the tape strips remaining unadhered and free from the last. The apparatus has then completed its function of detachably securing an insole to a last bottom.

Another aspect of the instant invention is concerned with a pair of tape strip fabricating and tape ribbon advancing mechanisms, the former being operative to fabricate the aforesaid tape strips and the latter being operative to transfer the tape strips to the tape guides so as to be in readiness for application to the shoe assembly. The tape strip fabricating mechanisms are mounted to the frame of the machine in an out-of-the-way position and to one side of the shoe assembly and are operative to apply paper backing strips at predetermined longitudinally spaced intervals to the adhesive side of their associated tape ribbons. In operation, each tape ribbon is advanced a predetermined amout through its tape strip fabricating mechanism. A ribbon of paper is also advanced through the tape strip fabricating mechanism in a direction that is normal to the path of travel of the tape ribbon therethrough so that the leading end thereof parallels and faces the adhesive side of and overlaps the tape ribbon. When the paper and tape ribbon are in such overlapping relationship they are caused to be pressed together into adhesion and, at substantially the same time, that portion of the paper ribbon that is in adhesion with the tape ribbon is severed from the remainder of the paper ribbon, thus causing a backing strip to be applied to the tape ribbon and thereby render that portion thereof non-adhesive.

The tape ribbon advancing means includes a pincers jaws associated with each tape strip fabricating mechanism, each pincers jaws being moveable towards and away from its associated tape strip fabricating mechanism and along a path that crosses laterally over the shoe assembly. After a backing strip has been applied to the tape ribbon as aforesaid, each pincers jaws is moved towards its associated tape strip fabricating mechanism and is caused to grip the free end of its associated tape ribbon, the free end of the tape ribbon having previously had a non-adhesive tab applied thereto. With the tape ribbons being so gripped, the pincers are moved laterally across the shoe assembly to simultaneously advance the tape ribbons therewith to their aforesaid positions above the shoe assembly, the pincers jaws being cooperative with the tape guides as to cause the withdrawn portion of the tape ribbon to be drawn into supportive engagement with the tape guides. When the tape ribbons have been advanced the desired amount and to the desired position the pincers jaws release the tape ribbon. A cutting device is then actuated to sever the tape ribbon at the midportion of the trailing backing strip so that one half of the trailing backing strip may define a tab located at the trailing end of the severed tape strip and the other end of the trailing backing strip may define a tab formed at the free, leading end of the tape ribbon. It should be noted that advancement of the tape ribbon by means of the pincers jaws also serves to draw a fresh portion of the tape ribbon into position to apply another backing strip thereto.

The invention will now be described in greater detail with reference to the accompanying drawings wherein.

Figures 15, 16, 37, 38, 39:
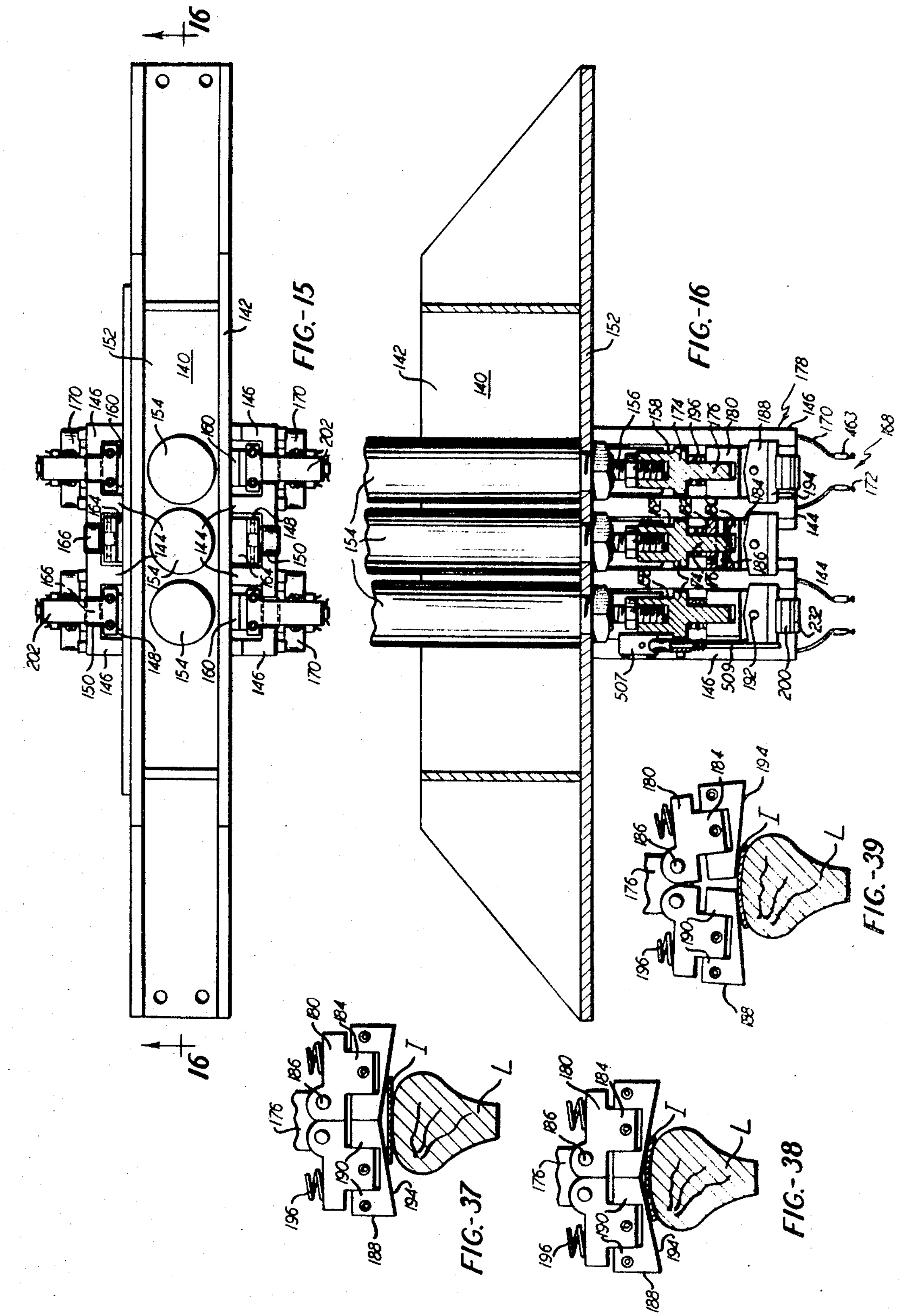
FIGURE 15 is a plan view of the tape strip applying and insole pressing mechanism as seen from the line 15—15 of FIGURE 12.
FIGURE 16 is a sectional view of the tape strip applying and insole pressing mechanism taken along the line 16—16 of FIGURE 15.
FIGURE 37 is a somewhat diagrammatical side view of the insole molding device as it initially engages the insole at the more curved shank portion of the shoe assembly.

FIGURE 38 is a somewhat diagrammatical side view of the insole molding device similar to that of FIGURE 37 but after it has been further urged downwardly to press the edge portions of the insole to the last bottom; and FIGURE 39 is a somewhat diagrammatical side view of the insole molding device similar to that of FIGURES 37 and 38 but after it has been moved into its fully downward pressing position against the insole bottom.

Figure 30:
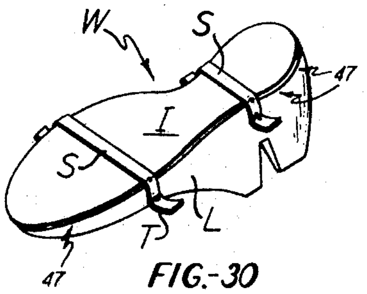
FIGURE 30 is a view of the shoe assembly after having been operated on by the machine, and having an aligned insole taped to the last bottom.
Figure 33:
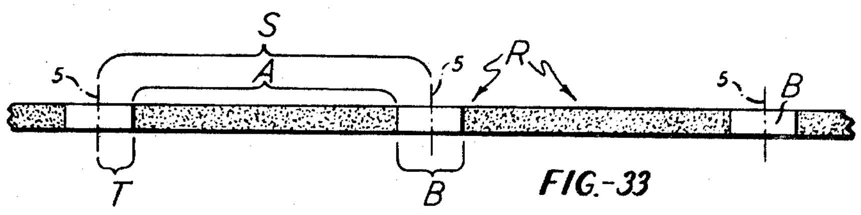
FIGURE 33 is a view of the tape ribbon having backing strips applied thereto at predetermined intervals.

The subject of the instant invention is an apparatus which is operative to assemble a shoe assembly W as illustrated in FIGURE 30. The shoe assembly W includes a last L having an insole I located in aligned, superposed position on the bottom of the last L and being secured thereto by means of a pair of tape strips S of unique construction. Referring to FIGURE 33, as will be described later in detail, the tape strips S are fabricated from a ribbon R of pressure sensitive adhesive tape to which backing strips B are applied at predetermined intervals to the adhesive side and along the length of the tape ribbon R. The backing strips B may be fabricated from paper or other flexible material capable of adhering to the tape ribbon R. After the backing strips B have been applied to the tape ribbon R, the tape ribbon R is cut at the centerline of each of the backing strips B (along the lines 5 in FIGURE 33) thereby severing the tape ribbon R into a number of tape strips S, each of which has a portion of the backing strip B adhered to the lengthwise extremities, thereby rendering these extremities non-adhesive. That portion of the tape ribbon R which has been or is to be severed from the remainder of the tape ribbon R will be referred to as the tape strip S and that portion of the backing strip B which is to be or has been located at the extremities of the tape strip S will be referred to as the tab T. Each of the tape strips S thus has non-adhesive tabs T formed at the extremities thereof with an adhesive portion A (see FIGURE 33) remaining exposed between the extremities.

Each tape strip S is applied transversely to the bottom of the insole I so that the ends of each tape strip S may be pressed to the sides of the last L, the exposed adhesive portion A of each tape strip S being of sufficient length to permit the tape strip S to adhere to the sides of the last L as well as to the bottom of the insole I. The non-adhesive tabs T of each tape strip S do not adhere to the sides of the last L and thus may serve to permit easy removal of the tape strips S from the shoe assembly in a manner later described. Although FIGURE 30 illustrates a pair of tape strip S located at the breastline and ballbreak portions of the shoe assembly respectively, the insole I may be secured to the last L by a single tape strip S of the same character which may be applied transversely or longitudinally of the shoe assembly, without departing from the spirit of the invention.

Figure 32:
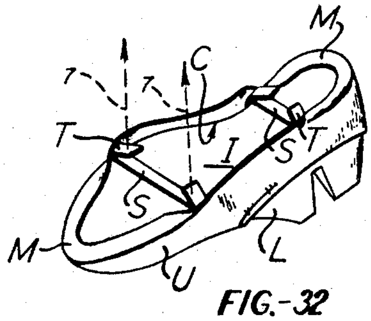
FIGURE 32 is a view of the shoe assembly after having been lasted at the heel and toe ends with the shank portion thereof, including the region where the tape strips are located, remaining unlasted.
Figure 31:
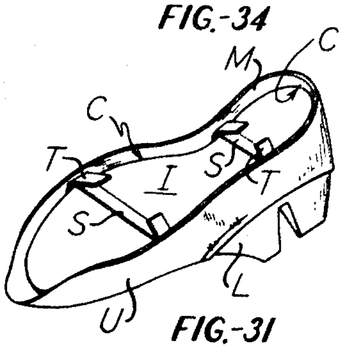
FIGURE 31 is a view of the shoe assembly having a shoe upper draped thereabout in readiness for a lasting operation, with the tabs of the tape strips extending out of the angulate region formed by the insole and marginal portion of the upper.

After the tape strip S has been taped to the shoe assembly W as described above a shoe upper U may be draped about the last L (see FIGURE 31) so that a marginal portion M of the upper U extends beyond the bottom of the insole I to form an angulate region C between the upper margin M and a corresponding marginal portion of the insole I. The upper U is draped about the last L in such a manner that each of the non-adhesive tabs T of each tape strip S is folded back along the side of the last L and protrudes out of the angulate region C and beyond the bottom of the insole I. The upper margin M may be lasted to the corresponding marginal portions of the insole I except in those angulate regions C where the tape strips S have been applied. FIGURE 32 shows such a shoe assembly which has been lasted at the heel and toe portions only, with the shank portion (including the regions occupied by the tape strips S) remaining unlasted. When the shoe assembly has been tightly lasted, the tape strips S are no longer needed to maintain the insole I in proper location on the last L and they may then be removed by gripping the non-adhesive tabs T and pulling them away from the bottom of the insole I as illustrated by the arrows 7 in FIGURE 32. The remaining unlasted portions of the upper U may then be lasted to the insole I.

Figure 2:
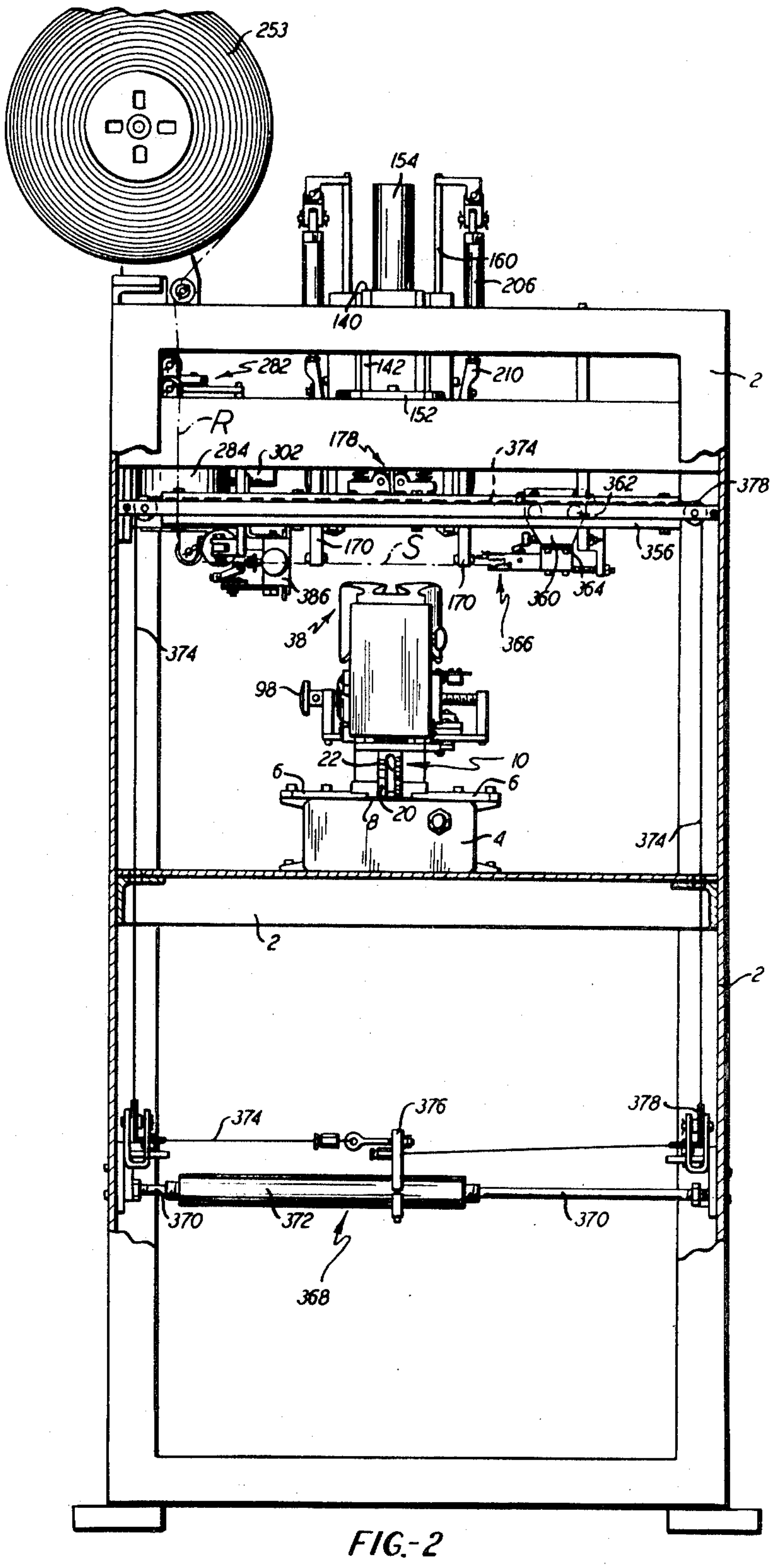
FIGURE 2 is a side elevation of the machine as seen from the line 2—2 of FIGURE 1.

In the accompanying specification the operator will be considered as being located at the front of the machine (to the right of the machine as shown in FIGURE 2). Directions which are towards and away from the operator may be referred to as being forward and rearward respectively when the direction is in reference to the frame of the machine or laterally when the direction is in reference to the shoe assembly or the devices which support the shoe assembly. Inasmuch as the shoe assembly is supported in the machine in such a manner that its lengthwise dimension is disposed laterally with respect to the operator, a direction which is towards or away from the operator may be referred to as being forward-rearward and/or lateral, depending on whether reference is being made to the frame of the machine, shoe assembly, or both. Directions which extend substantially parallel to the lengthwise dimension of the shoe assembly (and thus laterally of the operator) will be referred to as being either heelward or toeward whether reference is being made to the workpiece or the frame of the machine, a direction extending from the operator's left to his right being referred to as toeward and a direction extending from the operator's right to his left being referred to as heelward.

Figure 3:
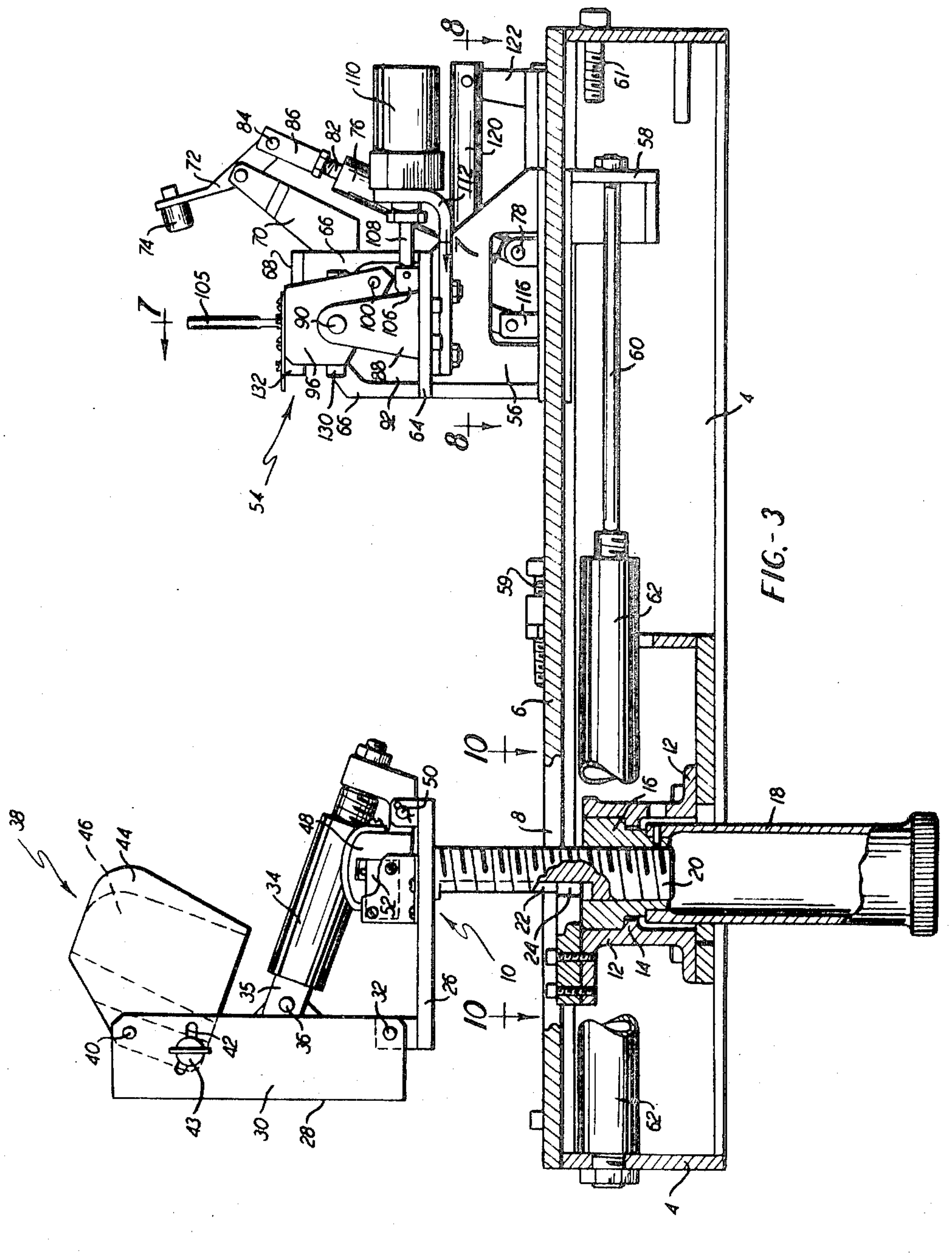
FIGURE 3 is a side elevation, partly in section, of the shoe assembly supporting and aligning mechanism, taken along line 3—3 of FIGURE 4.
Figure 4:
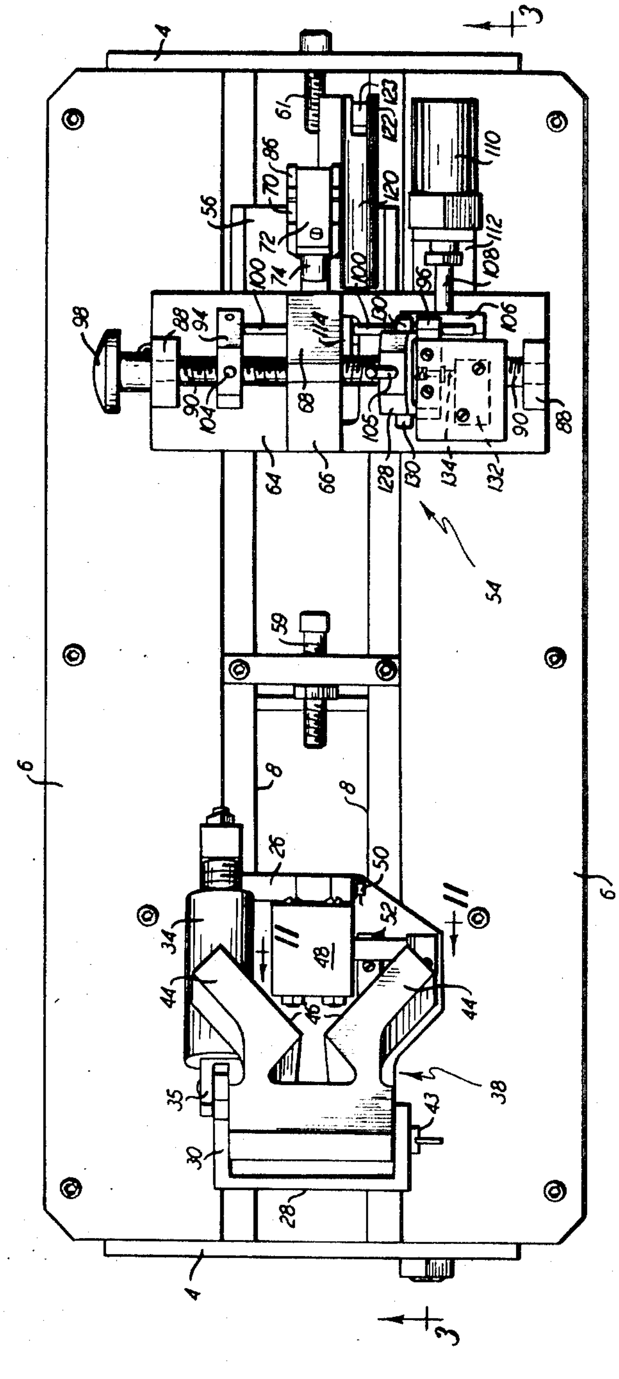
FIGURE 4 is a plan view of the shoe assembly supporting and aligning mechanism.
Figure 10:
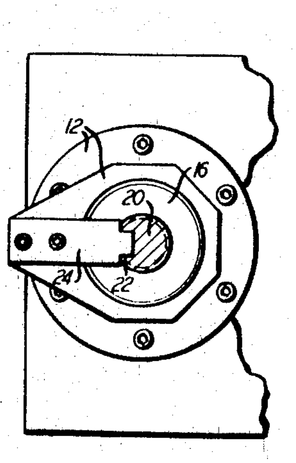
FIGURE 10 is a plan view, partly in section, of the adjustable heel post as seen from the line 10—10 of FIGURE 3.

Referring to FIGURES 1, 2, 3 and 4 the machine has a frame 2 to which a table 4 is secured. Mounted to the table 4 in a manner described below are devices for supporting and properly orienting the shoe assembly, which includes a last L and an insole I, at the heel and at the toe portions thereof. The table 4 has a top 6 in which a heelward-toeward slot 8 is formed. As illustrated in FIGURE 3, a heel supporting device 10 is mounted to the table 4 by means of a bushing 12 which is secured to the table 4 below the level of the table top 6. A shoulder 14 is formed along the cylindrical bore of the bushing 12 and a nut 16 is rotatably supported on the shoulder 14 so as to be contained within the bushing 12. The nut 16 may be provided with an extension 18 secured thereto and depending therefrom to facilitate rotation of the nut. A column 20 extends upwardly of and beyond the table top 6 and is in threaded engagement with the nut 16, the column 20 having a guideway 22 formed therein for engagement with a key 24 mounted to the bushing 12 so as to preclude rotation of the column 20 as the nut 16 is rotated (see FIGURE 10). Thus rotation of the nut 16 serves to adjust the height of the column 20 and the heel supporting device 10 carried thereon. The heel supporting device 10 includes a plate 26 which is secured to the upwardly extending end of the column 20. A gage support 28 having a pair of toewardly extending walls 30 is pivotally mounted at its lower end to the heelward end of the plate 26 for pivotal motion in a heelward-toward direction by means of the pivot 32. The gage support 28 is caused to so pivot, for a purpose later described, by means of an air motor 34 which is pivotally mounted to the toeward end of the plate 26 and which has the piston rod 35 thereof pivotally connected to the gage support 28 by means of a pivot 36. Located at the upper end of the gage support 28 and between the toewardly extending walls 30 thereof is a V-shaped heel gage 38. The heel gage 38 is pivotally mounted to the gage support 28 by means of the pivot pin 40 which is suspended between the forwardly extending walls 30 of the gage support 28. At least one of the walls 30 is provided with a slot 42 for accommodation of a wing blot 43 which is threaded into the heel gage 38, and may be tightened to effect a locking of the heel gage 38 to maintain it in a desired position with respect to the gage support 28. The heel gage 38 has a pair of toewardly diverging legs 44 having inwardly facing surfaces 46 which are adapted to embrace the heel end of a last L and to contact the last L along the bottom peripheral portion thereof, designated generally by the numeral 47 in FIGURE 30, at points which are tangent to the bottom peripheral portion 47.

Figure 11:
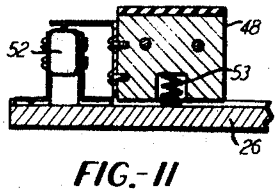
FIGURE 11 is a sectional view of the heel block and associated switch taken along the line 11—11 of FIGURE 4.

The heel end of the last is supported on a heel block 48 which is located on the plate 26 and is pivotally mounted to the toeward end thereof for limited movement in a heightwise direction by means of the pivot 50. The heel block 48 is in operative engagement with a switch 52 (see also FIGURE 11), also mounted on the plate 26 so that when the heel block 48 is pivoted downwardly towards the plate 26 in response to the placing of a last on the heel block 48, the switch 52 may be actuated and may thus signal other elements of the control circuit of the machine to perform their respective functions as will be later described. A compression spring 53 interposed between the plate 26 and heel block 48 serves to maintain the heel block 52 in a normally upward position so that the switch 52 is normally unactuated.

The inclination of the heel gage 38 with respect to the gage support 28 is adjusted so that when the shoe assembly is at rest on the heel block 48, the inner surfaces 46 of the legs 44 of the heel gage 38 may simultaneously contact the bottom peripheral portion 47 of the last L and the edge of the insole I.

The toe supporting device 54 includes a toe slide 56 which is supported on the table top 6 and is in engagement with the slot 8 formed therein such that the toe slide 56 may be guided in sliding motion along the table top 6 in a heelward-toeward direction which is towards and away from the heel supporting device 10. This movement of the toe slide 56 is caused by a bracket 58 depending therefrom to which the piston rod 60 of an air motor 62 is connected, the other end of the motor 62 being secured to the heelward end of the table 6. Thus activation of the motor 62 serves to draw the toe slide 56 and the components mounted thereto towards or away from the heel supporting device 10. The maximum extent to which the slide 56 may move in a heelward direction is determined by an adjustable stop bolt 59 which is secured to the table 4 heelwardly of and in alignment with the slide 56 so as to be abuttable thereby. Similarly, the maximum extent to which the slide 56 may move in a toeward direction is determined by an adjustable stop bolt 61 which is secured to the underside of the toeward end of the table 4 and extends towards the bracket 58.

Figure 5:
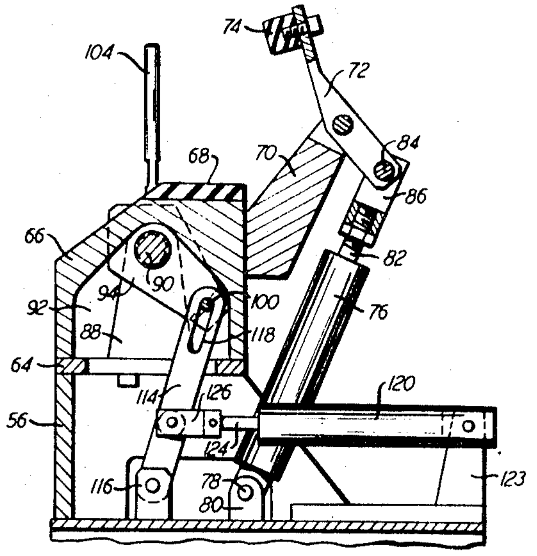
FIGURE 5 is a sectional view of the toe supporting and aligning mechanism taken along the line 5—5 of FIGURE 6.

Mounted to the top of the toe slide 56 is a platform 64 which extends laterally on both sides thereof. A toe rest bracket 66 is secured to the platform 64 and has a flat surface 68 adapted to receive and support the toe end of the last. Formed integrally with and extending toewardly of the toe rest bracket 66 is clevis 70. An arm 72 is pivotally mounted at a point intermediate its ends to the clevis 70 for pivotal motion in a vertical plane. Secured to the heelward end of the arm 72 is a toe holddown 74 which is adapted to effect a clamping of the toe of the shoe assembly between it and the surface 68 of the toe rest bracket 66 upon rotation of the arm 72 so that the heelward end thereof is brought towards the toe of the shoe assembly (counter clockwise as seen in FIG. 3). This motion of the arm 72 and toe holddown is affected by means of an air motor 76 which is pivotally mounted to the toe slide 56 by means of the pin 78 and clevis 80, the clevis 80 being formed integrally with the toe slide 56 (see FIG. 5). The piston rod 82 of the motor 76 is similarly pivotally mounted to the forward end of the arm 72 by means of the pin 84 and clevis 86 so that actuation of the motor 76 serves to pivot the toe holddown 74 towards and away from the surface 68 of the toe rest bracket.

Incorporated in the toe supporting device 54 is a mechanism which in cooperation with the heel supporting unit is effective to properly locate the insole I of the shoe assembly with the bottom of the last L. Secured to the lateral extremities of the platform 64 are a pair of upwardly extending lugs 88. A laterally disposed shaft 90 is rotatably journaled at its ends to the lugs 88 and is spaced above the platform 64. An opening 92 is provided in the toe rest bracket 66 to permit the shaft 90 to pass therethrough. Both laterally extending halves of the shaft 90 are threaded, the threads of each half being of opposite direction than those of the other half. A pair of nuts 94, 96 are located on the shaft and are in threaded engagement therewith the nut 94, being on one half of the shaft 90 and the nut 96 being on the other half of the shaft 90 so that the toe rest bracket 66 is located between the nuts 94, 96. It must thus be seen that, due to the opposed threads on each half of the shaft 90, the lateral spacing between the nuts 94, 96 may be varied by rotating the shaft 90 while precluding simultaneous rotation of the nuts 94, 96. Rotation of the nuts 94, 96 is precluded in a manner described below. A knob 98 is provided to facilitate rotation of the shaft 90. A rod-like guide bar 100 is secured to the lower portion of the nut 94 and extends laterally towards the nut 96 where it is slidably received in a hole 102 formed in the lower portion of the nut 96 (see FIG. 9). As the shaft 90 is rotated to adjust the spacing between the nuts 95, 96, the rod 100 may slide within the hole 102.

Mounted to and extending upwardly from the nuts 94, 96 are a pair of pin-like deflecting members 104, 105, the deflecting member 104 being mounted to the nut 94 and the deflecting member 105 being mounted to the nut 96, so that the deflecting members 104, 105 may straddle the surface 68 of the toe rest bracket 66. Thus, with the last being supported by the heel support 10 and the surface 68 of the toe rest bracket 66, the toe slide 56 may be moved heelwardly towards the toe end of the shoe assembly, thus causing the pins 104, 105 to bear against the periphery of the bottom of the last L to simultaneously rigidly clamp the shoe assembly between the deflecting members 104, 105 and the heel gage 38 and deflect the insole I into superposed final alignment with the bottom of the last L.

For the purpose of precluding toward rotation of the deflecting members 104, 105 and nuts 94, 96 in response to abutment of the deflecting members 104, 105 with the last L, a wedge 106 is provided which is adapted to be interposed between the bottom portion of the nut 96 and the upper surface of the platform 64 so that the wedge 106 may become sandwiched therebetween. The connection of the nuts 94, 96 by means of the rod 100 is operative to preclude forward rotation of the nut 94 when the nut 96 is so precluded. The wedge 106 is secured to the heelwardly extending piston rod 108 of an air motor 110, the motor 110 being mounted to a bracket 112 which is secured to and extends toewardly of the platform 64. The motor 110 is actuable to urge the wedge 106 heelwardly to a position between the nut 96 and the platform 64 and to retract the wedge 106 toewardly to permit rotation of the nut 96.

For a purpose later described, it is desirable under certain circumstances, to deliberately cause the nuts 94, 96 and the deflecting members 104, 105 mounted thereto to rotate toewardly away from the shoe assembly. This result is effected by means of an arm 114 (see FIGURE 5) which is pivoted at its lower end to the toe slide 56 by means of a conventional pin and clevis arrangement 116. The other end of the arm 114 extends upwardly and has a longitudinal slot 118 formed longitudinally therein. The rod 100 which connects the nuts 94 and 96 passes through and is in engagement with the slot 118, the location of the rod 100 being such that its longitudinal axis is at a lower elevation than the longitudinal axis of the shaft 90 about which the nuts 94, 96 pivot. When the nuts 94, 96 and deflecting members 104, 105 are rotated to their most heelward position (i.e. towards the shoe assembly) the rod 100 is contained within the upper end of the slot 118). Heelward rotation of the arm 114 will thus effect a toeward rotation of the nuts 94, 96 and deflecting members 104, 105, the rod 100 sliding in and towards the lower end of the slot 118 during this motion. It may be noted that the rod 100 and arm 114 also cooperate to preclude rotation of the nuts 94, 96 as the shaft 90 is rotated to vary and adjust the aforementioned lateral spacing between the nuts, 94, 96. The heelward-toeward pivoting movement of the arm 114 is caused by an air motor 120, having a clevis 122 formed at its most toeward end, and which is pivoted to a lug 123 formed integrally with the toe slide 56. The motor has a heelwardly extending piston rod 124 which is pivotally connected to the arm 114 by means of the pin and clevis arrangement 126.

Figure 6:
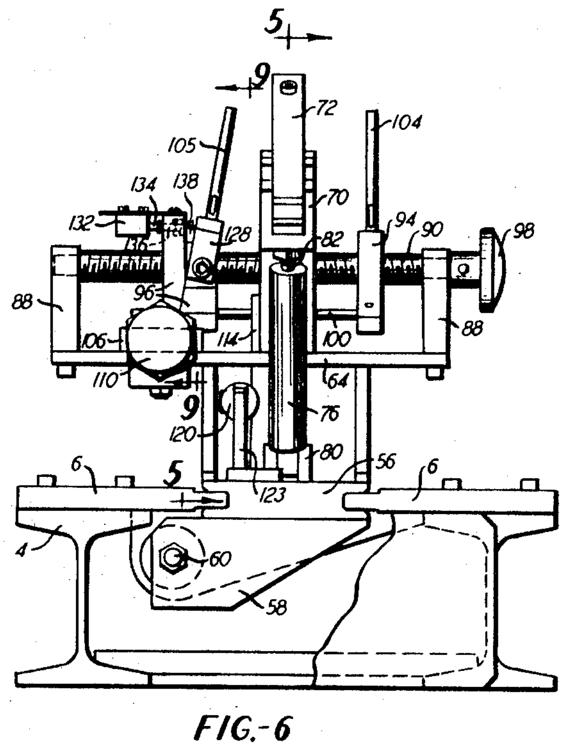
FIGURE 6 is a side elevation, partly broken away, of the toe supporting and aligning mechanism as viewed from the toeward side of the machine.
Figure 7:
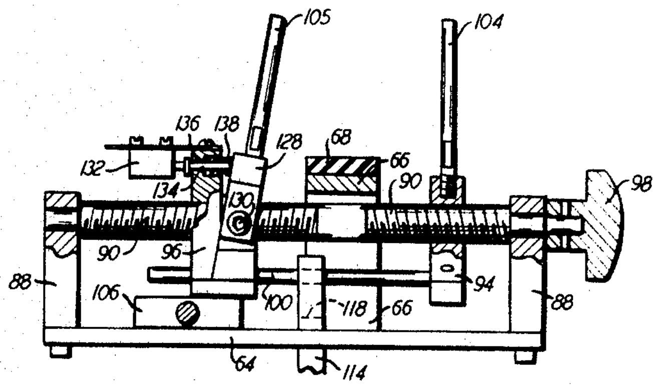
FIGURE 7 is a sectional view of the toe supporting and aligning mechanism taken along the line 7—7 of FIGURE 3.
Figure 8:
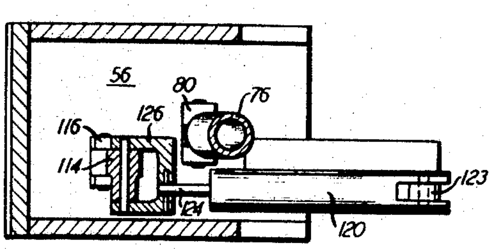
FIGURE 8 is a sectional view of the toe slide and motors mounted thereto taken along the line 8—8 of FIGURE 3.
Figure 9:
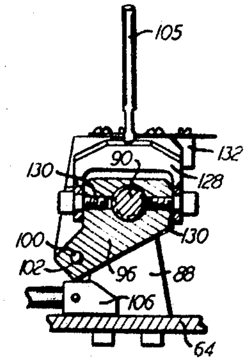
FIGURE 9 is a sectional view of the yoke and its deflecting member taken along the line 9—9 of FIGURE 6.

As illustrated in FIGURES 6, 7 and 9 the deflecting member 105 is mounted to the nut 96 so as to be pivotally moveable with respect thereto in a lateral direction by means of a yoke 128, the free ends of which are connected to the nut 96 by the threaded pins 130, the deflecting member 105 being secured to the upper portion of the yoke 128. A switch 132 is located outwardly of and is mounted to the nut 96 and has an actuating plunger 134 extending inwardly through a hole 136 formed in the nut 96 to accommodate the plunger 134. The plunger 134 is so oriented as to be in alignment with the side of the yoke 128 so as to actuable upon outward lateral pivoting of the yoke 128 about the pins 130. A compression spring 138 is interposed between the yoke 128 and the nut 96 to bias the yoke 128 in an inward position thereby normally maintaining the switch in an unactuated condition. It may thus be seen that when the toe slide 56 has carried the deflecting members 104, 105 heelwardly into initial abutment with the toe end of the last L, continued rearward movement of the toe slide 56 will cause the deflecting member 105 and yoke 128 to pivot outwardly, thereby depressing the plunger 134 and actuating the switch 132. The switch 132 is integrated into the control circuit of the machine and is effective, upon actuation, to simultaneously terminate actuation of the motor 62, thereby stopping the heelward travel of the toe slide 56, cause the motor 76 to be actuated to bring the toe holddown 74 to bear against the bottom of the toe portion of the insole I thereby insuring that the insole I corresponds to the contour of the last bottom, and to trigger the actuation of other mechanisms described below.

When the last L is placed on the heel and toe supports 10, 54, the relatively flat forepart portion of the last bottom lies in a plane which is inclined downwardly and toewardly of the deflecting members 104, 105 so that when the toe support 54 is moved heelwardly to bear against the shoe assembly, the deflecting members 104, 105 may additionally tend to hold the forepart portion of the insole I against the bottom of the last L during the subsequent taping operation. If the last L is relatively flat bottomed, the heel support 10 may be raised by rotating the nut 16 to thereby tilt the entire shoe assembly, including the forepart portion thereof, toewardly.

After the heel and toe supporting devices have been effective to simultaneously displace the insole I into registry with the bottom of the last L and rigidify the shoe assembly the tape strips S may be applied thereto. Referring to FIGURES 1, 12, 14, 15 and 16 a channel 140 is secured to the frame 2 above the table 4 and extends in a paralleling heelward-toeward direction. Mounted to and depending from the outside of each of the channel wall 142 of the channel 140 are a pair of vertically extending T-shaped guide members 144 and a pair of L-shaped guide members 146 which are so spaced that each guide member 144, 146 forms a pair of vertical guideways 148, 150 with each adjacent guide member (see FIGURE 15). Secured to the base 152 of the channel 140 is a bank of three heelwardly-toewardly aligned air actuated motors 154, the piston rods 156 of which extend downwardly towards the table 4. A U-shaped support bracket 158, having upwardly extending legs 160 is secured to the downwardly extending end of the most heelward and most toeward piston rods 156, the upwardly extending legs 160 of the support brackets 158 being contained within the guideways 148. A similar support bracket 162 having shorter upwardly extending legs 164 is secured to the intermediate piston rod 156 so as to be intermediate the support brackets 158 and has the upwardly extending legs 164 thereof contained within the guideways 148 formed by the adjacent T-shaped guide members 144. Rollers 166 are rotatably mounted to the outside of each of the legs 160, 164 and are contained within the more narrow guideways 150. Thus it may be seen that actuation of the motors 154 will independently effect movement of the U-shaped support brackets 158, 162 and all the components mounted thereto in a direction which is vertically towards and away from the table 4.

Figure 12:
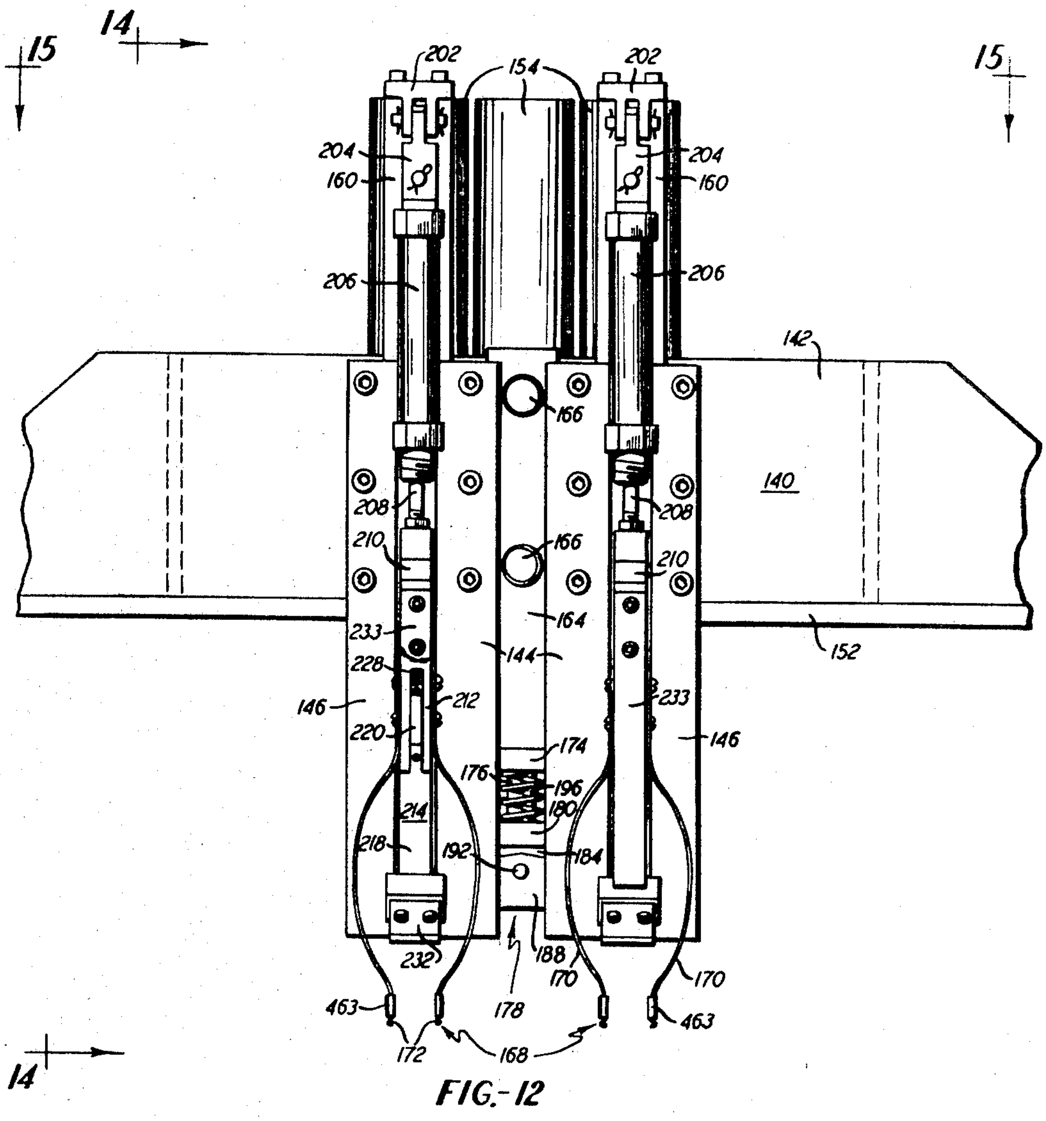
FIGURE 12 is a front elevation of the tape strip applying an insole pressing mechanism.

Among the components which are ultimately supported by the support brackets 158 are the tape guides 168, there being one located on each side of the most toeward and most heelward support brackets 158. Referring to FIGURE 12 it may be seen that each tape guide 168 includes a pair of downwardly extending, bowed leaf springs that form hangers 170 the lowermost end of the leaf springs 170 being curled to form a pair of channels 172 having their openings facing each other so that the channels 172 of each tape guide 168 may cooperate in defining a stirrup to support a strip of tape by its edges. The channels 172 are arranged so as to support the tape strip S laterally of the table 4. The tape guides 168 which are associated with the most toeward support member 158 have their channels 172 oriented in lateral alignment so that a tape strip S may be supported, by its ends, in spaced lateral relationship to the table 4 and the ball break region of the shoe assembly supported thereon. The tape guides 168 which are associated with the most heelward support member 158 have their channels 168 similarly oriented in lateral alignment to support a tape strip S in the same manner as the toeward tape guide 168 but in a position which is more adjacent the breastline region of the shoe assembly. A mechanism (later described in detail) is provided which is effective to fabricate a tape strip S of above described design and to then bring the tape strip S to the tape guides 168 so that they may support the tape strips S in proper location above the shoe assembly in readiness for subsequent operation.

Figure 13:
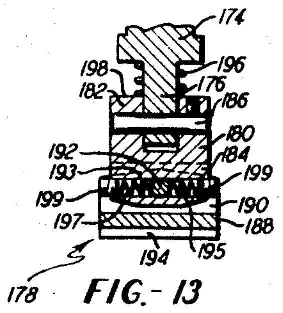
FIGURE 13 is a sectional view of the insole pressing device taken along the line 13—13 of FIGURE 14.

Referring to FIGURES 13 and 16 depending from the base 174 of each of the U-shaped support brackets 158, 162 is a lug 176 from which is suspended a pressing and insole molding device 178 which is operative to simultaneously press the tape strip S to the insole I bottom and to deformably mold the insole I in such a manner and under such force that the insole I assumes the contour of the bottom of the last L. Each pressing and molding device 178 includes a pair of connecting blocks 180, each of which has a clevis 182 formed at its upper inner end and a lug 184 depending from its bottom. The connecting blocks 180 are pivotally mounted by their clevises 182 to the lug 176 by means of pins 186, so that the inner ends of the clevises 182 are adjacent to each other. Connected to each of the connecting blocks 180 is a pressing block 188 having the upper portion thereof formed into a clevis 190 adapted to embrace the lug 184 which depends from its associated connecting block 180. Each of the pressing blocks 188 is connected to its associated connecting block 180 for both pivotal and limited heelward-toeward movement with respect thereto by means of a laterally disposed pin 192 which is secured at its ends to the clevis 190 of the pressing block 188 and has its midportion slidably contained in a heelwardly-toewardly disposed slot 193 formed in the lug 184 so that the pressing block 188 may slide in a heelward-toeward direction between the closed ends of the slot 193. When in an idle, non-pressing condition, the each pressing block 188 is maintained in substantially centralized location on its asociated connecting block 180 by means of a pair of compression springs 195 which are contained in a heelwardly-toewardly disposed bore 197 formed in the lug 184, the bore 197 intersecting the slot 193 so that the springs 195 may abuttingly straddle the pin 192. The springs 195 are encapsulated within the bore 187 and maintained in abutment with the pin 192 by means of threaded plugs 199 which are screwed into the open ends of the bore 197. The bottom pressing surfaces 194 of the pressing blocks 188 are sloped upwardly from the lateral extremities thereof to their inner extremities to facilitate the insole molding operation as will be later described. The aforesaid mounting of the pressing blocks 188 permits them to have a limited amount of universal movement so that when they are subsequently brought to bear against the bottom of the shoe assembly they may assume a contour corresponding substantially to that of the last bottom and thereby more effectively mould the insole to the contour of the last bottom. A compression spring 196 is interposed between the bottom of the base 174 of each U-shaped support member 158, 162 and the upper surface 198 of each of the connecting blocks 180 thereby biasing the lateral ends of the connecting block 180 downwardly.

With the shoe assembly properly positioned on the table 4 and a pair of tape strips S suspended laterally over the shoe assembly by means of the tape guides 168 the motors 154 are actuated to move the U-shaped support members 158, 162 and the components carried thereon downwardly towards the shoe assembly. Inasmuch as the tape guides 168 are mounted on the support members 158 so that their lower, tape supporting ends, are at a lower elevation than the bottom surfaces 194 of the pressing members 188, the downward movement of the support members 158 will cause the tape guides 168 to carry the tape strips S into contact with the bottom of the insole I prior to contact of the pressing members with the insole thus causing the tape strips to adhere lightly to the insole bottom. Continued downward movement of the support members 158 causes the stirrups of the tape guides 168 to be pulled downwardly out of engagement with the ends of the tape strips S thus depositing the tape strips S on the bottom of the insole I at the breastline and ballbreak regions thereof. Continued actuation of the motors 156 is then effective to bring the bottom surfaces 194 of the pressing blocks 188 to bear against the bottom of the insole I to simultaneously press the tape strips S more firmly to the insole I and deform the insole I into a shape corresponding to the contour of the last bottom. The mounting of each of the support members 158, 162 to the machine for movement which is independent of the other support members permits each pair of the pressing blocks 188 to be brought to bear against the portion of the shoe assembly over which it is supported, irrespective of the shape of the last L and the difference in height of the heel and toe ends thereof. As a practical matter, the shape of most lasts is such that, when supported bottom-up in the machine, the toe portion thereof will be at a greater elevation than the heel portion. It maybe seen that when the motors 156 are actuated to move the support members 158, 162 downwardly towards the shoe assembly the devices mounted to the most toeward support member 158 will engage the toe end of the shoe assembly before the devices mounted to the most heelward support member 158 will engage the heel portion of the shoe assembly. Thus the tape strip S supported by the most toeward tape guides 168 will contact the insole before the tape strip S which is supported by the most heelward tape guides 168 contacts the insole I and the pressing blocks 188 supported by the most toeward support member 158 will similarly engage the insole I before the pressing blocks 188 supported by the most heelward support member 158 engages the insole I.

At this stage in the operational cycle of the machine the last L, insole I, and tape strips S are pressed together with the ends of each of the tape strips S lying loosely and unsupported at the sides of the last L. Referring to FIGURES 14, 34, 35 and 36, incorporated into the machine are a number of moveable fingers 200 which are supported and guided by guiding mechanisms which are effective to cause the fingers 200 to initially engage the shoe assembly in the peripheral region where the last L, insole I, and tape strip S meet and to thereafter move downwardly along the side of the last L, following the contour thereof so as to press the heretofore free ends of the tape strips S into adhesion with the sides of the last L, thereby securing the insole to the last L. Those extreme end portions of the tape strips S having tabs T formed thereon, do not adhere, however, to the sides of the last L. A finger 200 is provided for each free end of each tape strip S.

Figure 14:
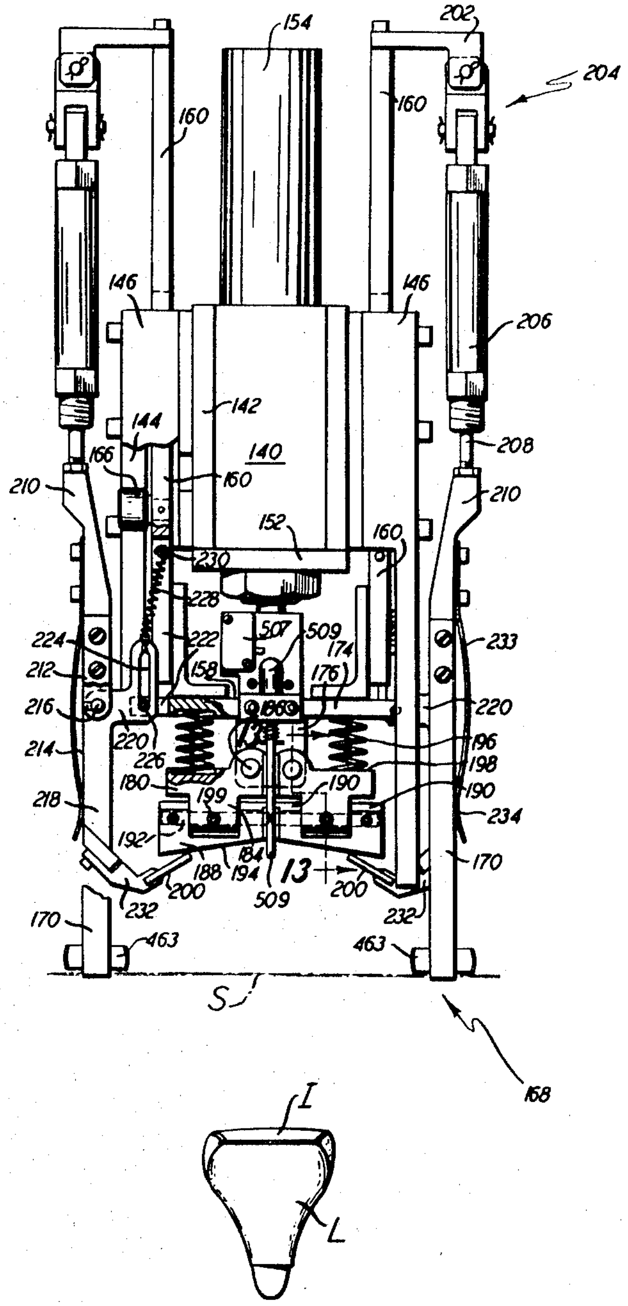
FIGURE 14 is a side elevation of the tape strip applying and insole pressing mechanism as seen from the line 14—14 of FIGURE 12.

Secured to and extending laterally outwardly from the top of each leg 160 of both the most heelward and toeward support members 158 is an outwardly extending bracket 202. Depending from each of the brackets 202, by means of a universal joint 204, is an air actuated motor 206 having a downwardly extending piston rod 208. A downwardly extending drive bar 210 having a forked lower end 212 is secured to the piston rod 208. A link 214, is pivotally supported within each forked end 212 by means of a pin 216. Each link 214 has a downwardly extending leg 218 and an inwardly extending arm 220, there being a vertical slot 222 formed in the lower portion of each leg 160 of the heelward and toeward support brackets 158 to accommodate a portion the arm 220 of the link 214. The slot 222 extends inwardly into the base portion 174 of the support members 158. A heightwise extending slot 224 is formed in that portion of the arm 220 of each link 214 which is accommodated by the slots 222 in the support members 158. Pins 226 are mounted to each support member 158 so as to traverse the slot 222 formed therein in the region of the base 174 and is contained within the heightwise extending slot 224 of the arm portion 220 of the link 214, thus permitting the link 214 to have rotary movement about and vertical movement along the pin 226, the plane of movement of the links 214 being substantially vertical at all times. A tension spring 228 is connected, at its ends, to the arm portion 220 of the link 214 and the upper end of the slot 222 as by a pin 230, so as to bias the link 214 upwardly such that the bottom of the heightwise extending slot 224 of the arm 220 is maintained in abutment with the pin 226. Secured to each lower end of the leg portion 218 of each link 214 is a bracket 232 to which the finger 200 is mounted. Each finger 200 extends inwardly and is formed from a resilient material which also possesses a relatively high coefficient of friction, such as rubber. When the fingers 200 and their guiding mechanisms are in an idle, out-of-the-way position, as illustrated in FIGURE 14, each piston rod 208 is retracted into its associated motor 206 thereby maintaining the bar 210 and the link 214 pivoted thereto in their uppermost positions. The spring 228 is effective to maintain the bottom of the heightwise extending slot 224 of the arm portion 220 of the link 214 in abutment with the pin 226. The parts are so constructed that when in such an idle position, the link 214 is in a substantially vertical position and each finger 200 is located below the laterally outward edge of the bottom surface 194 of its associated pressing block 188. Thus, the fingers 200 and their guiding mechanisms may have motion which is both unitary with and independent of the U-shaped support members 158. The fingers 200 and their associated mechanisms are maintained in their idle, out-of-the-way position with respect to the support members 158 until the motors 156 have been actuated to bring the pressing block 188 to bear against the bottom of the shoe assembly. It should be noted that the fingers 200, when in an idle position, are maintained in a position which is spaced laterally from the sides of the last L so that as the pressing blocks 188 are moved towards the shoe assembly the fingers 200 will not be sandwiched therebetween.

When the pressing blocks 188 have been brought to bear against the bottom of the insole I and have effected the pressing of the tape strips S thereto as well as having deformably molded the insole I, the motors 206 are caused to be actuated thereby imparting a downward movement to the link 214 at the pivot pin 216 in opposition to the action of the spring 228 which urges the arm portion 220 of the link 214 upward to maintain the bottom of the slot 224 in abutment with the pin 226, thus causing the link 214 to substantially pivot about the pin 226 in a direction which is towards the shoe assembly. The substantially pivotal movement of the link 214 will terminate when the finger 200 comes into abutment with the shoe assembly in the region where the insole I, last L, and tape strip S meet. Inasmuch as abutment of the fingers 200 with the shoe assembly precludes further substantially pivotal motion of the link 214 about the pin 216, continued actuation of the motor 206 is effective to impart a substantially downward motion to the link 214 the spring 228 being effective to simultaneously bias the link 214 inwardly towards the shoe assembly so that the fingers 200 may follow the contour of the sides of the last L to thereby press the tape ends into adhesion with the sides of the last L as they move downwardly. If, in a particular application, inwardly directed pressure exerted on the links 214 is insufficient to cause the tape ends to properly adhere to the last L, this pressure may be increased by using a leaf spring 233 which is secured to each of the bars 210 and having its free resilient end 234 in abutment with the outer side of its corresponding link 214. The extent of downward travel of the links 214 and fingers 200 is limited by means of abutment of the upper end of the slot 224 in the arm 220 and the pin 226. After the motors 206 have effected the substantially downward stroke of the fingers 200, the control circuit of the machine is effective to reverse the motors 206 to thereby cause retraction of the links 214 and fingers 200 to their idle, out-of-the-way position, the fingers 200 being effective in this retraction, to re-press the tape ends to the last L to further insure effective adhesion. When the links 214 have been returned to their idle position, the motors 156 are then actuated to withdraw the support members 158, 162 and the devices mounted thereto upwardly to their original out-of-the-way position. When shoes of comparatively smaller sizes or narrower widths are to be fabricated in the machine or when the manufacture of a particular style of shoe makes it desirable to deformably mold the insole to the contour of the last bottom in the region of the toe, it may be necessary to retract the toe deflecting members 104, 105 to an out-of-the-way position before the pressing blocks 188 are brought to bear against the insole bottom to preclude mechanical interference therebetween. As aforementioned, this may be done by causing actuation of the motor 120 (see FIGS. 3, 5).

At approximately the same time as the motors 154 are actuated to withdraw the support members 158, 162, the motors 34, 76 and 62 are actuated to simultaneously and respectively cause the heel gage 38 to be pivoted rearwardly out of engagement with the heel end of the shoe assembly, cause the toe holddown 74 to be pivoted upwardly away from the toe end of the shoe assembly, and to remove the toe slide 56 forwardly to thereby retract it and all the devices carried thereon from the toe end of the shoe assembly. The last L, with the insole I securely taped to the bottom thereof may then be removed from the machine and a fresh unassembled insole and last may then be introduced and the cycle started anew.

Figures 17, 17A, 17B, 18, 18A, 19A:
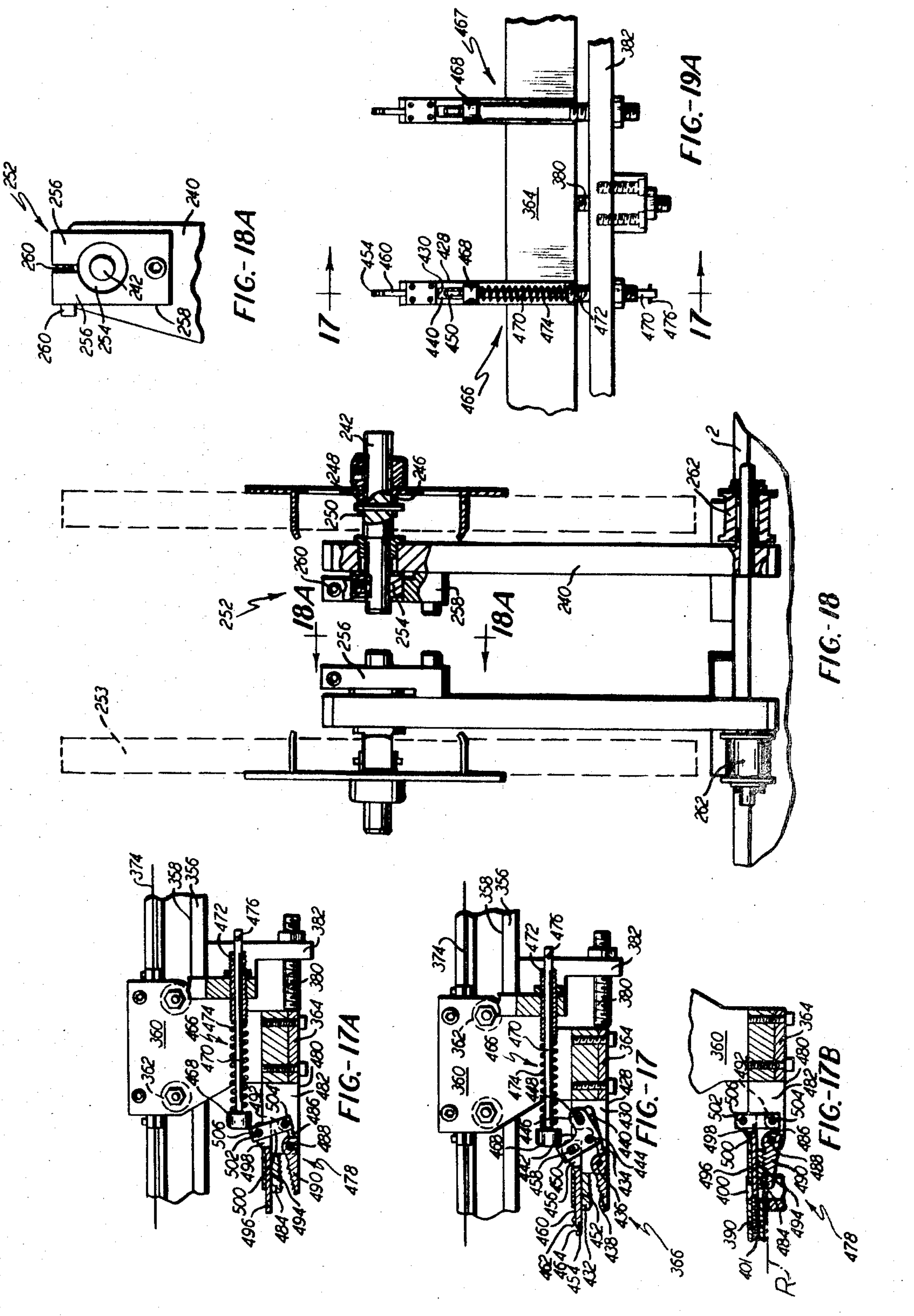
FIGURE 17 is a sectional view of the pincers jaws in an open, deactivated condition taken along the line 17—17 of FIGURE 19A.
FIGURE 17A is a sectional view of the alternate pincers jaws in an open, deactivated condition similar to that illustrated in FIGURE 17.
FIGURE 17B is a sectional view of the alternate pincers jaws after it has been actuated to a closed and locked position.
FIGURE 18 is a front elevation, partly in section, of the tape roll supporting device.
FIGURE 18A is a side elevation of the tape roll braking device as viewed from the line 18A—18A of FIGURE 18.
FIGURE 19A is a plan view of the pincers deactivators and the pincers jaws illustrating deactivation of both breastline and ballbreak pincers jaws, with both the ballbreak and breastline pincers jaws having been carried to their most forward position.

As mentioned earlier, incorporated into the machine are mechanisms for fabricating the tape strips S, there being a toewardly located mechanism 236 for fabricating the tape strip S which is to secure the ballbreak portion of the shoe assembly and a heelwardly located mechanism 238 for fabricating the tape strip S which is to secure the breastline portion of the shoe assembly. Both mechanisms are located upwardly and laterally rearward of the table 4. Inasmuch as both mechanisms 236, 238 are of substantially identical construction and operation only the toewardly located mechanism 236 will be described. It should be noted that in the illustrative embodiment of the invention, although the toewardly located and heelwardly located tape strip fabricating mechanisms 236, 238 are of substantially identical construction, the heelward-toeward directions of components and motions thereof are reversed. Thus when a component of the toewardly located tape strip fabricating mechanism 236 is described as extending or having motion in a heelward direction, the corresponding component of the heelwardly located tape strip fabricating mechanism 238 will extend or have motion in a toeward direction. Similarly when a component of the toewardly located tape strip fabricating mechanism 236 is described as extending or having motion in a toeward direction, the corresponding component of the heelwardly located tape strip fabricating mechanism 238 will extend or have motion in a heelward direction. Referring to FIGURE 18 the mechanism has an upwardly extending tape roll support 240 mounted to the frame 2 laterally of the channel 140. A spindle 242 is journalled at a point intermediate its ends to the upper end of the support 240 and has a disc-shaped tape roll holder 244 detachably mounted to one end thereof. The disc 244 has a hub 246 adapted to fit on the spindle 242, the rotation of the hub 246 on the spindle 242 being precluded by means of engagement of a pin 248 which projects diametrally from the spindle 242 with a pair of mating slots 250 in the hub 246. The other end of the spindle 242 is in engagement with a braking device 252 (see also FIGURE 18A) which is adapted to frictionally retard the rotation of the spindle 242 thus insuring that as the tape is stripped from the roll 253 it will remain relatively taut. The braking device 252 consists of a drum 254 which is secured to the other end of the spindle 242 and which is rotatable between the jaws 256 of a braking block 258. The degree of braking which is exerted on the spindle 242 may be varied by tightening or loosening the jaws 256, there being a bolt 260 provided for this purpose.

Figures 22, 23, 24:
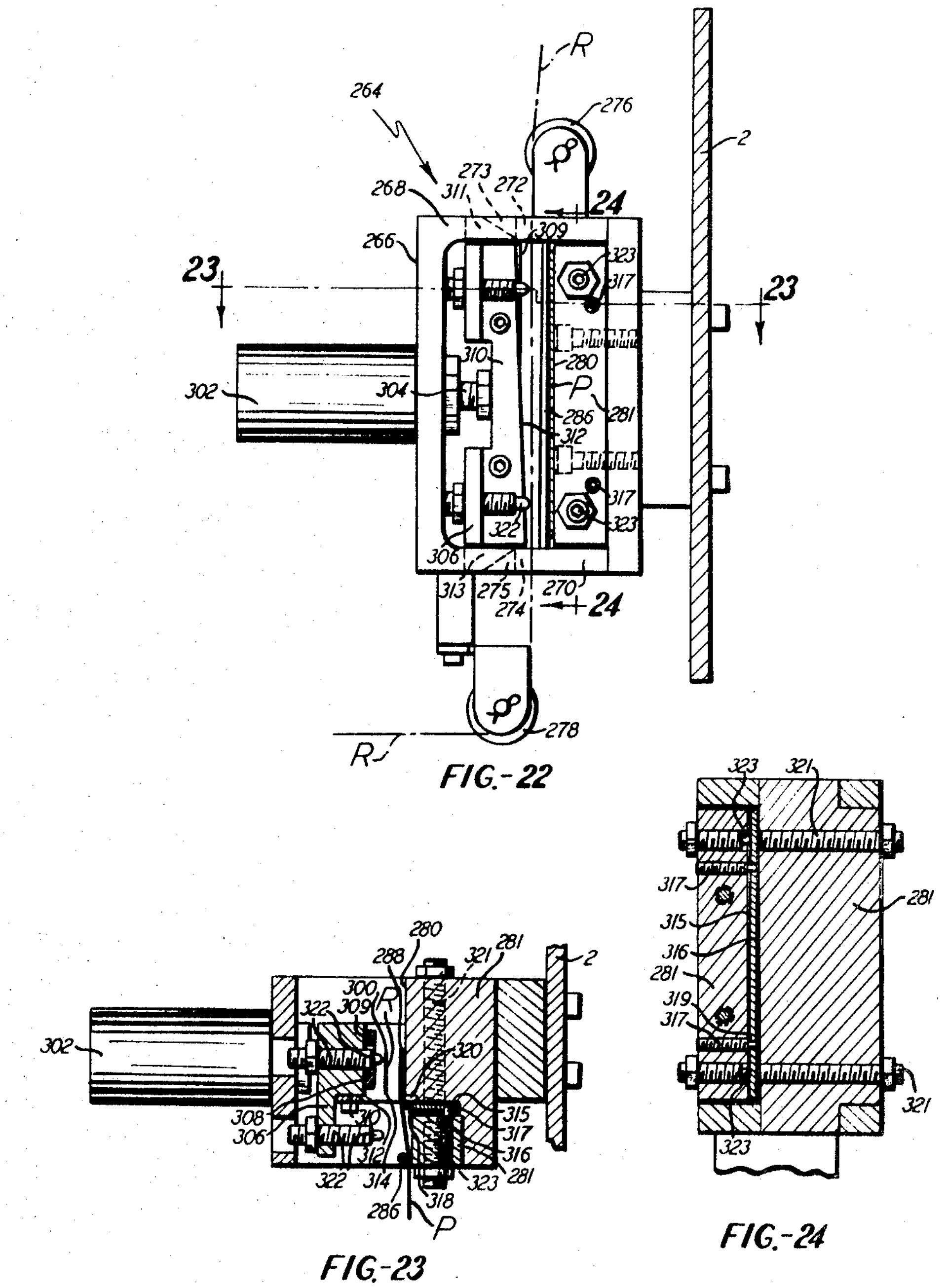
FIGURE 22 is a side elevation of the backing strip applying device as viewed from the line 22—22 of FIGURE 26.
FIGURE 23 is a sectional view of the backing strip applying device taken along the line 23—23 of FIGURE 22.
FIGURE 24 is a section taken on the line 24—24 of FIGURE 22.
Figure 25:
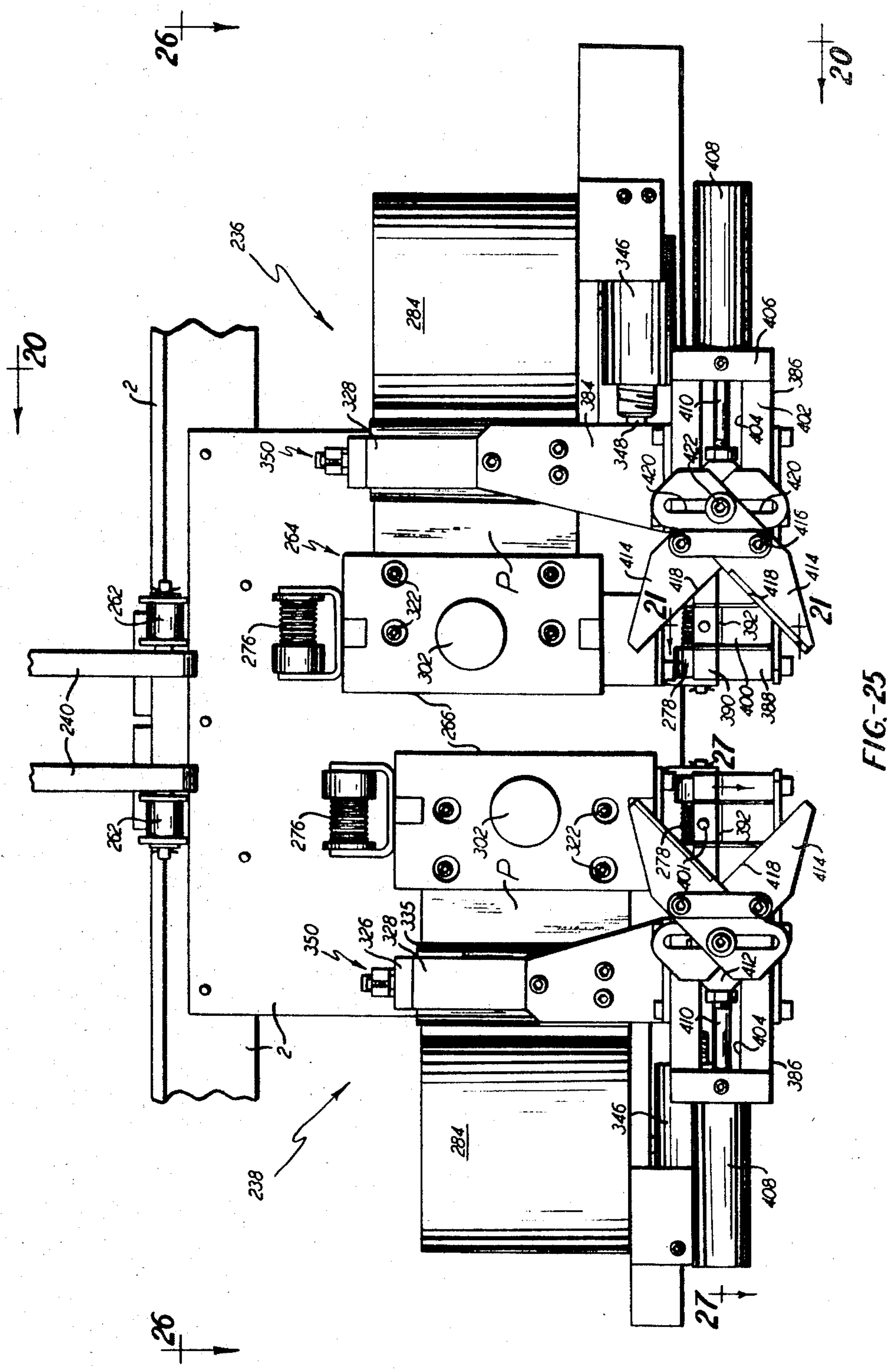
FIGURE 25 is a front elevation of the tape strip fabricating mechanism.

Referring to FIGURE 25, as the tape T is stripped from the roll 253 it is pulled (by a device later described) downwardly past a guide roller 262, and into a paper applying device 264 which fabricates a paper backing strip B of at least the same width as the tape and affixes it to the adhesive side of the tape T so that that portion of the tape may no longer present an exposed adhesive surface. As shown in FIGURES 22, 23 and 24 the paper applying device 264 includes a housing 266 which is secured to the frame 2 and is located below the tape roll. The upper and lower walls 268, 270 of the housing have slots 272, 274 formed therein which are adapted to permit the tape ribbon R to pass through the housing in a vertically downward direction. The backing strip B is affixed to the tape as it passes through the housing 266 by a device therefor which is contained in the housing 266. The tape is guided through the slots 272, 274 in the housing 266 by guide rollers 276, 278 which are mounted to the housing 266 adjacent the slots 272, 274, the rollers 276, 278 being effective to dispose the tape R within the housing 266 in such a manner that the adhesive surface of the tape faces and is spaced in substantially paralleling relationship from the interior anvil surface 280 of the housing wall 281.

A paper-feeding device 282 later described is mounted to the frame 2 toewardly of the housing 266 and is operative to periodically feed paper P from a roll 284 thereof in a horizontally heelward direction and into the open, toeward end of the housing 266 (see FIGURES 20, 25 and 26). A vertical pin 286 is mounted to the forward, open end of the housing 266 adjacent the anvil 280 and serves to guide the leading edge 288 of the paper P so that it may be properly interposed between the adhesive surface of the tape ribbon R and the anvil 280. The paper feeding device 282 feeds the paper P an amount corresponding to at least the width of the tape so that the leading edge 288 of the paper will extend at least to the heelward edge 300 of the tape after the feeding has been effected.

An air actuated motor 302 is mounted to the housing 266 in such a manner that the piston rod 304 thereof is moveable towards and away from the anvil 280, there being a hammer 306 secured to the end of the piston rod 304. The hammer 306 has a vertical face 308 which lies in a plane paralleling the anvil 280 and is located in alignment with the superposed tape R and paper end so that upon actuation of the motor 302 to move the hammer 306 towards the anvil 280 the tape R and paper P may become pressed therebetween to cause the paper to firmly adhere to the tape. The face 308 of the hammer 306 may be covered with a sheet 309 formed from a resilient, compressible material such as rubber.

The upper and lower ends of the hammer 306 have lugs 311, 313 formed thereon which extend respectively into the forwardly-rearwardly disposed slots 273, 275 formed in the upper and lower walls 268, 270 to thereby maintain the hammer 306 in its vertical disposition in its movement towards the anvil 280 (see FIGURE 22).

For the purpose of severing the backing strip portion from the remainder of the roll of paper a knife 310 having a heightwise disposed cutting edge 312 is secured to the hammer 306 so that its cuting edge 312 is located opposite the toeward edge 314 of the tape. Another knife 316 is supported within the wall 281 and has a heightwise disposed cutting edge 318 projecting beyond the surface of the anvil 280 and towards the cutting edge 312 of the knife 310. The knives 310, 316 are cooperative to sever that portion of the paper P which has adhered to the tape from the remainder of the roll of paper. Referring to FIGURES 22, 23, and 24 it may be seen that the cutting edge 312 of the knife 310 is disposed at a slight incline to the vertical and to the cutting edge 318 of the knife 316 so that the initial engagement of the knives 310, 316 occurs at the bottom portions thereof, the effect of which is to provide a clean cutting stroke and insuring that the paper P will be sharply and neatly severed. The cutting stroke of the knives 310, 316 will thus progressively proceed upwardly from the bottom of the paper P to the top thereof. The stationary knife 316 is mounted to the wall 281 in such a manner that the cutting edges 312, 318 do not engage each other until after the lowermost portion of the cutting edge 312 has been moved rearwardly beyond and has crossed but not contracted the lowermost portion of the cutting edge, thus insuring that when the knives 310, 316 ultimately do engage each other, they will be in proper position with respect to each other to effect the aforementioned cutting stroke. The stationary knife 316 is contained in a slot 315 formed in the wall 281, that slot 315 being greater in width than the thickness of the knife 316 so that the knife 316 may have a limited degree of freedom therein. Mounted to the wall 281 and extending into the slot 315, in a direction which is substantially normal to the plane of the knife 316, are a pair of vertically spaced locating pins 317, the ends of which are contained in similarly spaced holes 319 formed in the knife 316, thus precluding any substantial movement of the knife 316 within the slot 315 in a direction other than a heelward-toeward one. For the purpose of adjusting the disposition of the knife 316 in the slot 315 a pair of vertically spaced stop bolts 321 are threaded into one side of the wall 281 such that one end of each thereof extends into the slot 315 in a direction that is substantially normal to the plane of the stationary knife 316. The extent that the stop bolts 321 extend into the slot 315 may be varied by simply rotating them. Mounted to the other side of the wall 281 for movement towards and away from the knife 316 in axial alignment with the stop bolts 321 are a pair of vertically spaced pins 323 which are biased towards and extend into the slot 315. The pins 323 and stop bolts 321 are cooperative to grip the knife 316 therebetween, with the orientation of the knife 316 within the slot 315 being governed by the extent to which each stop bolt 321 extends into the slot 315, the biased pins 323 being effective at all times to maintain the knife 316 in abutment with the stop bolts 321. It may thus be seen that when the lower of the stop bolts 321 extends into the slot 315 a greater amount than the upper stop bolt 321, the knife 316 will be so disposed that cutting edge 318 thereof will be askew with respect to the cutting edge 312 of the knife 310, with the lowermost portion of the cutting edge 318 being spaced toewardly of the lowermost portion of the cutting edge 312. Inasmuch as the knives 310, 316 extend beyond the surfaces 308, 280 respectively a cut-out 320 is provided in the wall 281 to accommodate the protruding knife 310 thereby permitting the surfaces 308, 280 to effectively press the tape and the paper together.

In order to hold the tape R and the paper P is a steady and fixed position during the cutting operation, a pair of vertically spaced pins 322 are moveably mounted to the hammer 306 on each side of the knife 310 and extend towards the anvil 280. The pins 322 extend a greater distance towards the wall 281 than the knife 310 so that as the motor 302 is actuated to move the hammer 306 towards the superposed tape and paper the ends of the pins 322 may serve to press the paper and tape against the interior surface of the wall 281, thereby maintaining them in proper position for the subsequent cutting and pressing operation. The pins 322 are resiliently biased towards the wall 281 so that the knife 310 and hammer 306 may continue to move towards the tape and paper under influence of the motor 302, with the pins 322 being effective to maintain the paper and the tape in proper position. Such pins or spring plungers are commercially available from Northwestern Tools, Inc., Dayton, Ohio.

Figure 26:
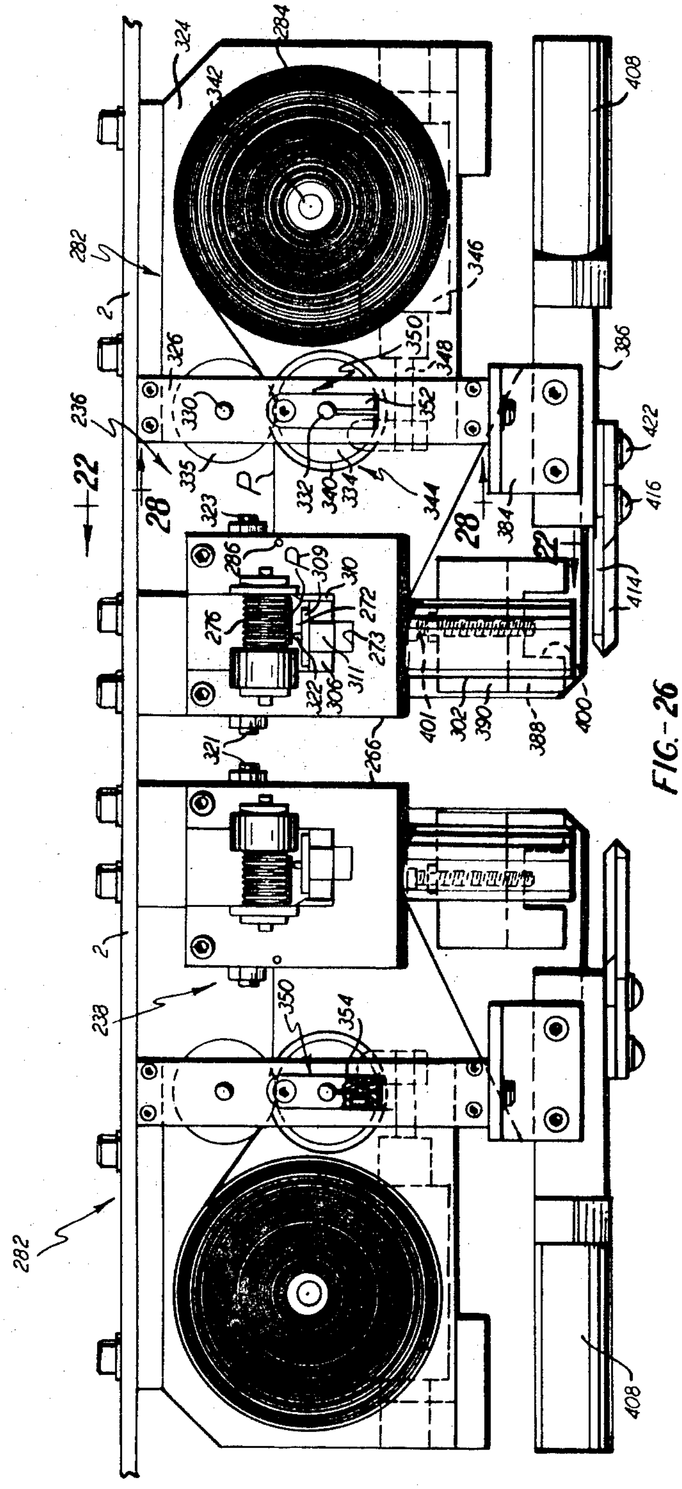
FIGURE 26 is a plan view of the tape strip fabricating mechanisms taken on the line 26—26 of FIGURE 25.
Figure 28:
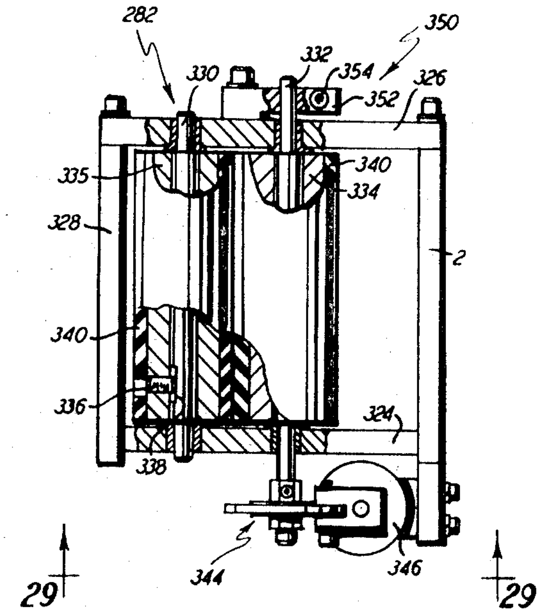
FIGURE 28 is a side elevation, partly broken away, of the paper ribbon feeding mechanism, with the paper roll removed, taken along line 28—28 of FIGURE 26.
Figure 29:
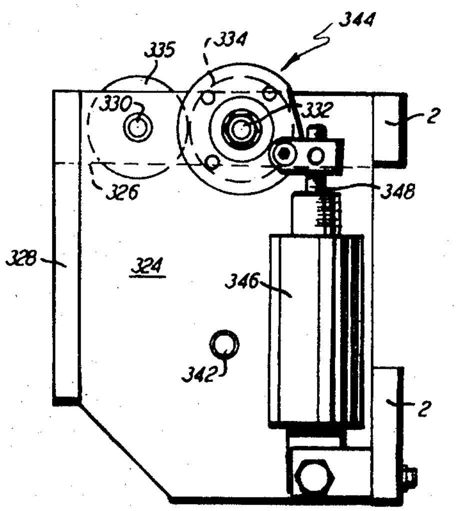
FIGURE 29 is a view of the underside of the paper ribbon feeding mechanism taken along the line 29—29 of FIGURE 28.

Referring to FIGURES 26, 28 and 29, the paper feeding mechanism 282 is located forwardly of the housing 266 and has a horizontal base plate 324 secured to and extending inwardly from the frame 2. Spaced above the base plate 324 and similarly secured to the frame 2 is an inwardly extending beam 326. The inwardly extending ends of both the beam 326 and the base plate 324 are joined by a vertical brace 328 which serves to more effectively rigidify the base plate 324, the beam 326 and the components mounted thereto. A pair of vertical, laterally spaced spindles 330, 332 are rotatably journaled, at their ends, to the base plate 324 and the beam 326. A drive roller 334 and an idler roller 335 are coaxially secured to the spindles 332, 330 respectively by means of set screws 336 and cooperative flat surfaces 338 formed on each of the spindles 330, 332. The peripheral surface 340 of each of the rollers 334, 335 is fabricated from rubber or other resilient material having a relatively high coefficient of friction. The dimensions of the aforementioned arrangement are such that the outer peripheries of each of the rubber surfaced rollers 334, 335 may be in continuous tangential contact with each other so that as the drive roller 334 is rotated, the idler roller 335 may rotate therewith. The resiliency and coefficient of friction of the peripheral surface 340 of the rollers 334, 335 is such that the paper P may be positively gripped therebetween and be fed heelwardly thereby into the toeward open end of the housing 266 upon rotation of the drive roller 334. The roll 284 of non-adhesive paper P is supported on the base plate 324 (see FIGURES 20, 26) toewardly of the rollers 334, 335, there being a pin 342 extending upwardly from the base plate 324 about which the roll 284 may be placed.

The spindle 332 has its ends protruding upwardly beyond the beam 326 and downwardly beyond the base plate 324. A one-way rotary clutch 344 is mounted to the downwardly protruding end of the inner spindle 322. The clutch 344 is driven by means of an air actuated motor 346 which is pivotally mounted to the frame 2 and has a rearwardly extending piston rod 348 which is operatively connected to the clutch 344. The clutch 344 is of such construction that as the motor 346 is actuated to cause the piston rod 348 to move heelwardly, the clutch 344 will slip so that no motion will be imparted to the drive roller 334, but as the motor 346 is actuated to cause the piston rod 348 to move toewardly the clutch may lock thereby causing rotation of the drive roller 334 (in a clockwise direction as seen in FIGURE 29). It may thus be seen this drive mechanism is effective to periodically feed the paper P which has been introduced between the rollers 334, 335 in a heelward direction. The dimensions of the clutch 344 and the stroke of the piston rod 348 are such that each forward stroke of the piston rod 348 will cause the rollers 334, 335 to advance the leading edge 288 of the paper P an amount equal to at least the width of the tape R. A clutch of the type described is commercially available from Warren M. Pike Associates, Boston, Mass.

A frictional brake 350 is mounted on the beam 326 and is in engagement with the upwardly protruding end of the spindle 332. It is operative to provide a sufficient amount of drag on the spindle 332 to preclude rotation of the spindle except when the motor 346 is actuated. The frictional brake 350 is a fork-like member having a pair of tines 352 which embrace the upper end of the spindle 332 and which may be drawn together to bear against the spindle end. A bolt 354, rotatable within the end of one of the tines and in threaded engagement with the end of the other tines, is provided for this purpose.

Figure 1:
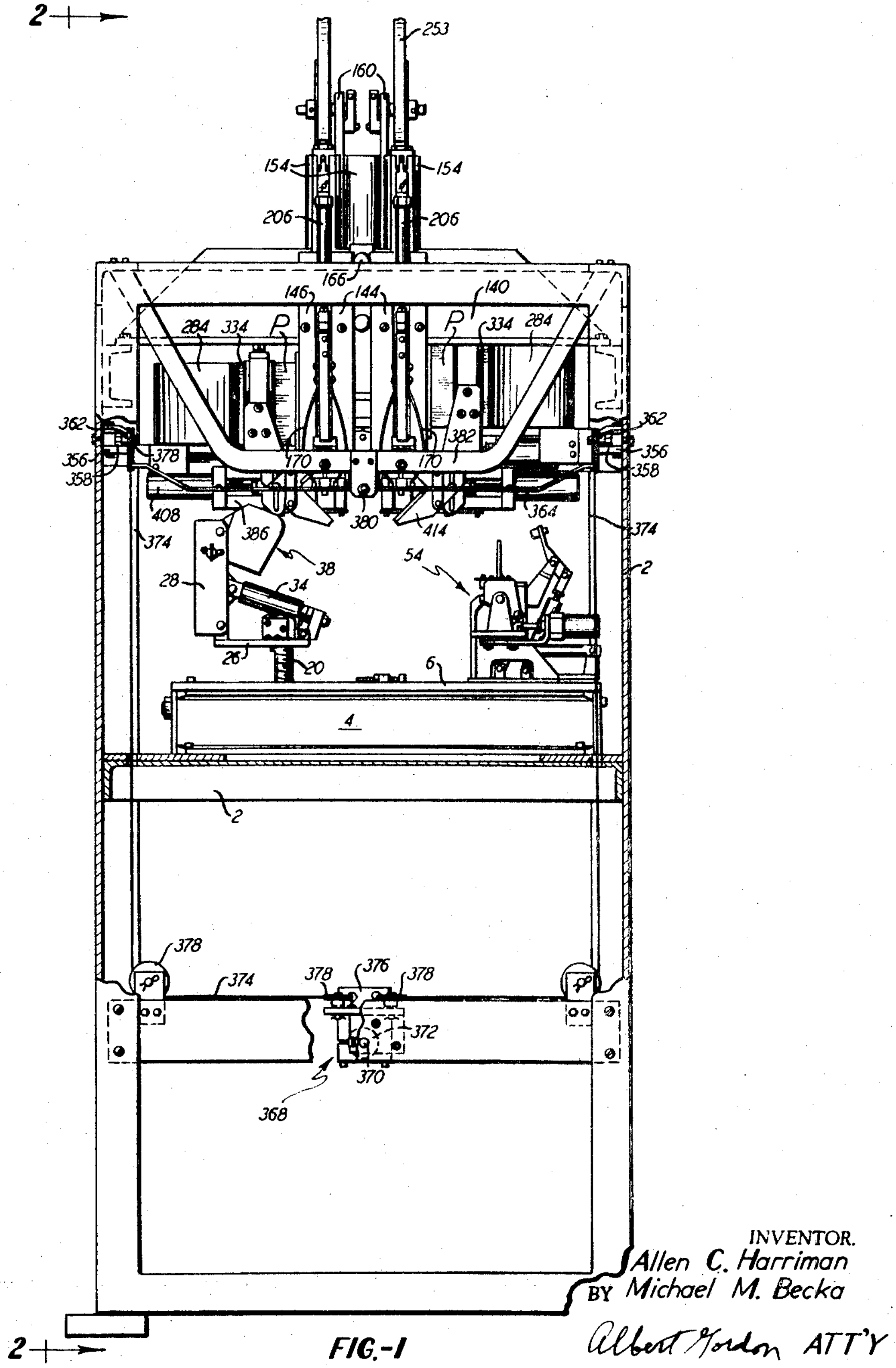
FIGURE 1 is a front elevation of the machine.

As mentioned earlier, a tape advancing mechanism is provided which is operative to pull the free end of the tape ribbon R so that the tape strip S portion thereof may be properly positioned with respect to the shoe assembly and a fresh portion of the tape ribbon R may be stripped from the tape roll 253 and drawn downwardly into the housing 266 in which a backing strip B may be applied. Referring to FIGURES 1, 2 and 17 a pair of laterally extending runners 356, on which this mechanism is moveably mounted, are mounted to the frame 2, one runner 356 being at the toeward end of the frame 2 and the other runner 356 being at the heelward end of the frame 2. Each runner 356 has a channel 358 formed lengthwise therein. A trolley 360 is moveably mounted to each of the runners 356 by means of rollers 362 which are rotatably mounted to the trolleys 360 and are contained within the channels 358. A support bar 364 extends in a heelward-toeward direction and is suspended at its ends from the trolleys 360 so that it may move, together with the trolleys 360, laterally over the table 4 in a foreward-rearward direction which is towards and away from the tape strip fabricating mechanisms 236, 238. Mounted to the support bar 364 are a pair of pincer jaws 366 (FIGURE 17), there being one pincer jaws 366 associated with each tape strip fabricating mechanism 236, 238. The pincer jaws 366 are so positioned in the machine and with respect to the free ends of the tapes that when the trolleys 360 have carried the pincer jaws 366 to the tape strip fabricating mechanisms the pincer jaws 366 may be closed to grip the free ends of the tape R whereupon the trolleys 360 may be moved to carry the pincer jaws 366 laterally across the table to their original remote, forward position thereby advancing the tape to a position wherein the leading tape strip S portion thereof is spaced laterally above the table 4 and a portion of tape which has been freshly stripped from the tape roll 253 is contained within the housing 266 in readiness for application of a backing strip B thereto.

The aforesaid movement of the trolleys 360 and pincer jaws 366 carried thereby is effected by means of an air actuated motor 368 which has a stationary piston rod 370 and a cylinder 372. The piston rod 370 is of greater length than the cylinder 372 and extends outwardly of both ends thereof, the extending ends of the piston rod 370 being secured to the frame 2 so that when the motor 368 is actuated the cylinder 372 thereof may move laterally and along the piston rod 370. The movement of the motor 368 is transmitted to the trolleys 360 by means of cables 374 to which the trolleys 360 are securely clamped, the ends of each cable 374 being secured to a bracket 376 mounted to the moveable cylinder 372 of the motor 368. Pulleys 378 are rotatably mounted to the frame 2 and are so arranged as to guide the cables 374 in a path such that as the motor 368 is actuated to move the cylinder 372 thereof forwardly, the trolleys 360, support bar 364 and pincer jaws 366 carried thereon may move rearwardly across the table 4 and towards the tape strip forming mechanisms. Similarly when the motor 368 is actuated to move the cylinder 372 thereof rearwardly the pincer jaws 366 will move laterally across the table 4 in a forward direction which is away from the tape strip forming mechanisms. The extent that the pincer jaws 366 may travel away from the tape strip forming mechanisms is governed by an adjustable stop bolt 380 which is threaded into a support bracket 382 that is in turn secured to the frame 2. The stop bolt 380 is positioned so as to be in the plane of movement of and extending towards the support bar 364.

Figures 19, 20, 21:
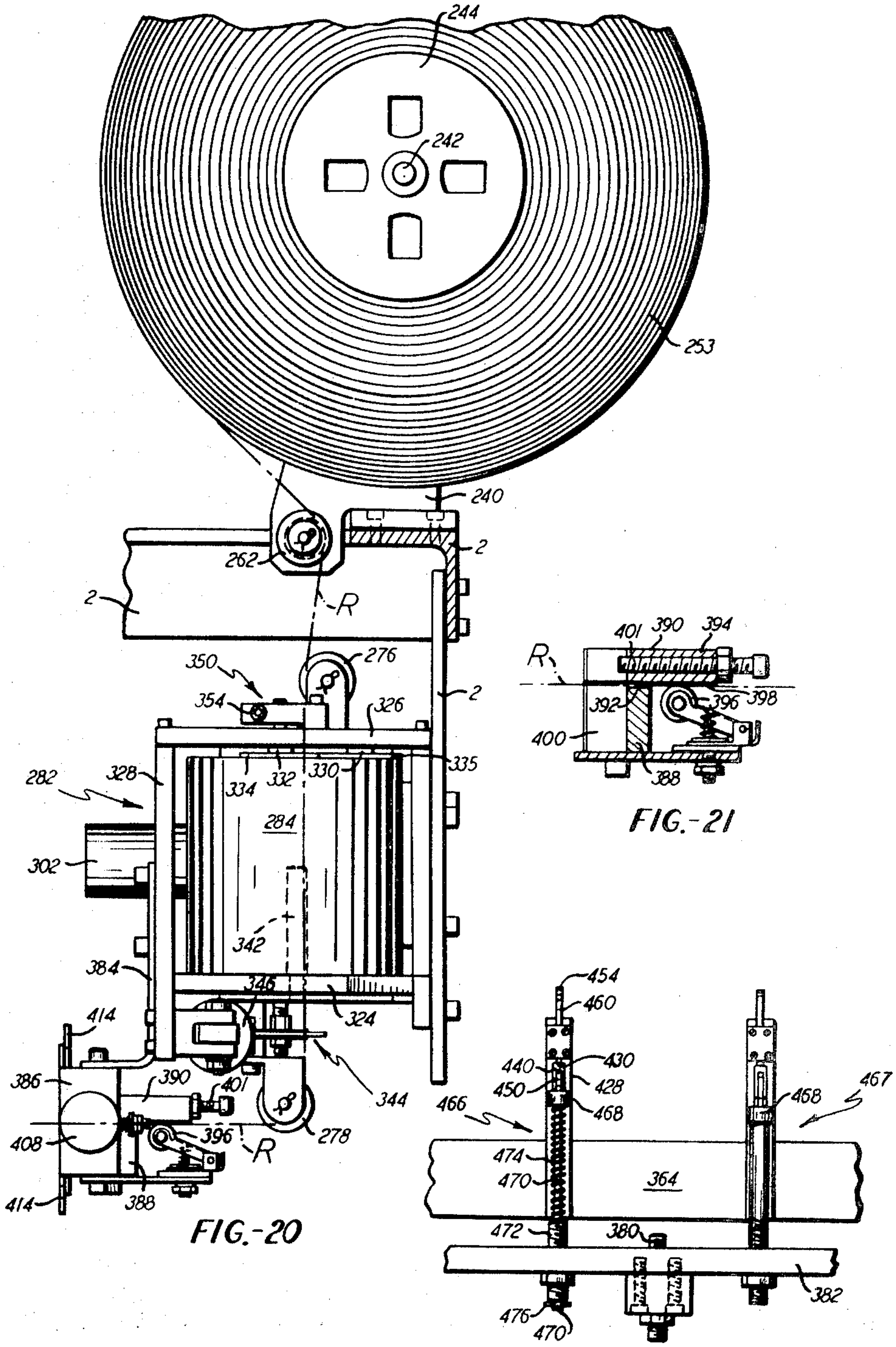
FIGURE 19 is a plan view of the pincers deactivators and pincers jaws illustrating deactivation of the breastline pincers jaws alone, with the ballbreak pincers jaws not yet having engaged the ballbreak pincers deactivator.
FIGURE 20 is a side elevation of the tape strip fabricating mechanism as viewed from the line 20—20 of FIGURE 25.
FIGURE 21 is a sectional view of the tape guide block taken along the line 21—21 of FIGURE 25.

Referring to FIGURES 2 and 20 a bracket 384 is secured to and extends inwardly from the housing 266. Depending from the bracket 384 is a scissor frame 386 which is an integral part of a cutting mechanism (later described in detail) that functions to sever the tape strips S from the tape roll 253 after the backing strips B have been affixed thereto. Mounted to, and heelwardly and rearwardly of the scissor frame 386 is a tape guide block 388 having a cap 390 secured to the upper surface thereof (see FIGURE 21). A groove is formed laterally in the upper surface of the block 388 thus providing a passageway 392 between the guide block 388 and the cap 390, the passageway 392 being of slightly greater width than the tape so that the tape may pass therethrough. The aforementioned members are arranged such that the passageway 392 is in alignment with the bottom of the guide roller 278 so that the passageway 392 and the guide roller 278 may cooperate to guide the tape horizontally forward from the housing 266. The cap 390 has an overhanging portion 394 extending towards the guide roller 278 and an idler 396 is biased upwardly against the bottom surface 398 of the overhanging portion 394 to maintain the tape R which is interposed therebetween in a taut condition. A vertical slot 400 is formed at the inward end of the combined tape guide block 388 and cap 390 and a stop bolt 401 is threaded through the cap 390 so that its end extends into the slot 400 for a purpose later described.

Figure 27:
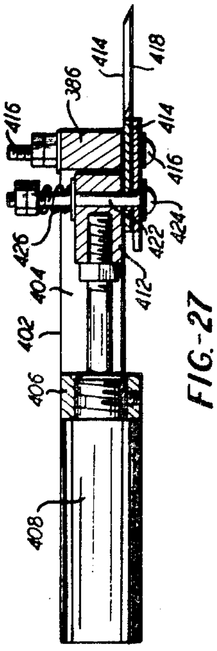
FIGURE 27 is a sectional view of a tape ribbon scissors mechanism taken along the line 27—27 of FIGURE 25.

Referring to FIGURES 25 and 27, the scissors frame 386 is U-shaped, having its legs 42 extending in a toeward direction and defining a guideway 404 therebetween. A bar 406 is secured to the free ends of the legs 402 of the scissors frame 386 and an air actuated motor 408, having its piston rod 410 extending heelwardly between the legs 402 of the scissors frame 386, is secured to the bar 406. A scissors slide 412 is secured to the end of the piston rod 410 and is slidably contained within the guideway 404. Located at the side of the heelward end of the scissors frame 386 are a pair of scissors blades 414 whihc are pivotally mounted thereto by means of vertically spaced pivot pins 416 so that each of the scissor blades 414 may pivot, at a point intermediate its ends, about its associated but separate pin 416. The effect of so spacing the pivots 416 is that as the scissor blades are pivoted towards each other the cutting edges 418 thereof may cooperate to effect a quicker and more precise drawcut stroke. The pivotal motion of the scissor blades 414 is effected by means of a slot 420 formed in a noncutting end of each of the scissor blades 414. A pin 422, mounted to the scissor slide 412, extends laterally through the slot 420 of each scissor blade 414. The slots 420 are formed at an incline in such a manner as to cause the scissor blades 414 to be pivoted towards each other in a cutting stroke when the scissor slide 412 and pin 422 are moved towards the motor 408 in response to actuation thereof and to thereafter cause the scissor blades 414 to be pivoted away from each other so as to open in response to actuation of the motor 408 to move the scissor slide 412 and pin 422 away from the motor 408. The pin 422 has a head 424 formed thereon for the purpose of retaining the pin 422 in the slots 420. The pin 422 is biased by means of a compression spring 426 to continually press the scissor blades 414 into abutment with each other thus insuring that the cutting edges 418 thereof will always be in contact with each other. The scissor frame 386 and scissor blades 414 are so arranged that the blades 414 pivot in a vertical plane which is located forwardly of the tape guide block 388 and so that the continually advancing intersection of the cutting edges defines a locus which substantially coincides with the horizontal plane of the tape strip S. The dimensions of the scissor blades 414 and drive mechanism therefor are such that when the blades 414 are in an open, non-cutting position, the cutting edges 418 thereof may be sufficiently spaced as to permit the pincers jaws 366 to pass therebetween.

Referring now to FIG. 17, each pincer jaws 366 includes a pincer housing 428 which is rigidly mounted to the support bar 364 and extends therefrom towards the tape strip fabricating mechanism. The pincer housing 428 has an enlarged vertical slot 430 formed therein and a fixed upper jaw 432 formed at its extending end. An arm 434 is pivotally mounted at its midportion in the pincer housing 428 by means of a pivot pin 436 in such a manner that one end of the arm 434 is contained within the slot 430 and the other end of the arm 434 extends outwardly of the pincer housing 428 and below the fixed upper jaw 432. The outwardly extending end of the arm is formed into a lower jaw 438 and the inwardly extending end of the arm 434 is formed into a clevis 440. A bellcrank 442 is pivotally mounted to the pincer housing 428 interiorally thereof by means of the pin 444 and has one leg 446 thereof pivotally connected to the clevis 440 by the pin 448. The other leg 450 of the bellcrank 442 extends upwardly and out of the slot 430. Formed along the upper surface of the extending end of the pincers housing 428 is a guideway 452 in which an actuating slide 454 is slidably contained. One end of the actuating slide 454 is contained interiorally of the pincer housing 428 and the other end of the actuating slide 454 protrudes beyond the end of the upper jaw 432. The end of the actuating slide 454 which is contained within the pincers housing 428 is formed into a clevis 456 which embraces the upwardly extending leg 450 of the bellcrank 442 and is pivotally connected thereto by means of the pin 458. It may thus be seen that when the protruding end of the actuating slide is urged forwardly towards the pincer housing 428, the bellcrank 442 will pivot rearwardly (clockwise as seen in FIG. 17) away from the fixed upper jaw 432 to thereby close the pincers 366.

In the operation of the machine it is desirable to lock the pincers 366 in their closed position to prevent the tape gripped therein from slipping from the jaws. For this purpose a flat leaf spring 460 is secured to the upper surface of the pincers housing 428 and extends beyond the end of the fixed upper jaw 432. The end of the leaf spring 460 is formed into a hook 462 and a cut-out 464 of shape corresponding to that of the hook 462 is formed in the outer end of the actuating slide 454 so that as the actuating slide 454 is urged forwardly into the pincers housing 428 to thereby close the pincers jaws 366, the hook 462 may be urged into the cut-out 464 by the resiliency of the leaf spring 460 thereby maintaining the jaws 366 in a closed position.

The orientation of the curled ends 172 of the tape guides 168 and the passageway 392 of the tape strip forming mechanisms 236, 238 is such that as the support bar 364 is moved rearwardly to carry the pincer jaws 366 towards and away from the tape strip fabricating mechanisms 236, 238, the pincers jaws 366 may move between the curled ends 172 of the tape guides 168, between the open blades 414 and into the vertical slot 400 of the tape guide block 388 where the free end of the tape ribbon R is located. In order to insure that the pincers jaws 366 pass freely between the ends of the tape guides 168 without interference therefrom, a curved deflector 463 (FIG. 12) is secured to the lower end of each bowed hanger 170. If the resilient hangers 170 are not in perfect alignment with the path of travel of the pincers jaws 366 so as to allow the pincers jaws 366 to pass freely therebetween, the pincers jaws 366, upon movement towards the tape guides 168, may engage the deflector 463 thus causing the resilient hanger 170 to which the engaged deflector 463 is secured to be deflected to one side of the path of travel of the pincers jaws 366 thus precluding entanglement therebetween. When the pincers jaws are carried into the slot 400 the protruding end of the activating slide 454 abuts the tape guide block 388 so that the continued rearward movement of the support bar 364 and pincers housing 428 may cause the pincers jaws 366 to close and grip the end of the tape ribbon R, the pincer jaws 366 becoming locked by means of the hooked leaf spring 460. The support bar 364 and pincers jaws 366 may then be moved forwardly away from the tape strip fabricating mechanisms, thus drawing the tape ribbon therewith such that the tape strip portion S thereof is spaced above and disposed transversely of the shoe assembly and a fresh, trailing portion of the tape ribbon R is contained within the tape strip fabricating mechanism. As the tape ribbon R is drawn forwardly, the edges thereof are caused to travel through the curled ends 172 of the tape guides 168 due to the aforementioned location of the tape guides 168.

When the tape ribbon R has been drawn forwardy the desired amount and to the desired position the pincers jaws 366 are caused to open thus releasing the tape ribbon R and terminating its withdrawal. Referring to FIGS. 17, 19 and 19A, pincers deactivators 466, 467 are secured to the support bracket 382 and extend rearwardlly towards their associated pincers jaws 366. Each of the pincers deactivators 466, 467, has an abutting end 468 which is adapted to be abutted by the upwardly extending leg 450 of the bellcrank 442 as the pincers jaws 366 is drawn forwardly, thus causing the leg 446 of the bellcrank 442 to pivot upwardly to thereby pivot the lower jaw 438 downwardly and release the tape ribbon.

It may be seen that in the illustrative embodiment of the invention, the tape strip S which is to be applied to the breastline portion of the shoe assembly need not be as long as that which is to be applied to the ballbreak portion of the shoe assembly, due to the greater width of the shoe assembly at the ballbreak portion than at the breastline portion thereof. The apparatus herein disclosed is operative to fabricate such tape strips of different lengths by causing each of the pincers jaws 366 to release its grip on its associated tape ribbon R when the desired amount of tape ribbon has been withdrawn. As shown in FIGS. 17, 19 and 19A the abutting end 468 of the breastline pincers deactivator 466 extends rearwardly towards its associated pincers jaws 366 a greater amount than the abutting end 468 of the ballbreak pincers deactivator 467 so that as the support bar 364 draws the pincers jaws 366 forwardly in unison, the more rearwardly extending breastline pincers deactivator 466 will cause its associated pincers jaws 366 to open and release the tape ribbon R gripped therein. The pincers deactivator 466 is constructed in a manner described below so as to permit the support bar 364 to continue its forward movement and thus carry the other pincers jaws 366 forwardly therewith, thereby continuing to draw the tape ribbon R gripped therein to a greater length, until that pincers jaws 366 is carried into abutment with the ballbreak pincers deactivator 467 whereupon the upwardly extending leg 450 of the bellcrank 442 may abut the end 468 of the ballbreak pincers deactivator 467, thus causing the leg 446 of the bellcrank 442 to pivot upwardly to thereby pivot the lower jaw 438 downwardly and relase the tape ribbon.

As illustrated in FIGS. 17, 19 and 19A, the breastline pincers deactivator 466 includes a rod 470 which is contained in a bushing 472, the bushing 472 being secured to support bracket 382. The rod 470 extends rearwardly towards the tape strip fabricating mechanism 238 and is slidable within the bushing 472 in a forward-rearward direction. The abutting end 468 of the pincers deactivator 466 is located at the rearwardly extending end of the rod 470 with a compression coil spring 474 being interposed between the bushing 472 and the abutting end 468 and surrounding the rod 470. The spring 474 is effective to bias the rod 470 in its rearwardmost position and is of such strength as to substantially maintain the rod 470 in its rearwardly extended position while the engagement therewith of the upwardly extending leg 450 of the bellcrank 442 causes the pincers jaws 366 to open and to thereafter yield forwardly so as to permit the support bar 364 to bring the other pincers jaws 366 into engagement with the ballbeak pincers deactivator 467 to thereby open the other pincers jaws 366. A retaining pin 476 may be secured to the forward end of the rod 470 to maintain the rod 470 within the bushing 472. Inasmuch as there is no more need for forward travel of the support bar 364 and the pincers jaws 366 after the breastline pinces deactivator 467 has caused its associated pincer jaws 366 to release the tape ribbon R, the breastline pincers deactivator 467 may be a simple bolt.

After the tape ribbons R have been drawn to their desired respective lengths and are supported in the tape guides 168 over the shoe assembly, the scissor blades 414 may be activated to sever the tape strip portions S from the tape ribbons R. It should be noted that when the tape ribbon R is withdrawn a lesser amount to thus provide a shorter tape strip S the positioning of the scissor blades 414 must be moved forwardly along the path of travel of the tape ribbon R so that the ends of the tape strip S which is severed therefrom will extend an equal amount beyond the edge of the bottom of the shoe assembly. Furthermore, when the tape strip S is to be of shorter length the backing strips B must be applied to the tape ribbon R at a location along the path of travel thereof which is closer to the cutting plane of the scissor blades 414. As illustrated in FIG. 25, the heelward tape strip fabricating mechanism 238 is located below the level of the toeward tape strip fabricating mechanism 236.

Referring now to FIGS. 17A and 17B, an alternatively structured pincers jaws 478 may be used in the apparatus in lieu of the pincers jaw 366 shown in FIG. 17. A pincers housing 480 is provided which is substantially identical to the pincers housing 366 shown in FIG. 17. The pincers housing 480 has an enlarged vertical slot 482 formed therein and a fixed upper jaw 484 formed at its extending end. An arm 486 is similarly pivotally mounted at its midportion in the pincers housing 480 by means of a pivot pin 488 in such a manner that one end of the arm 486 is contained within the slot 482 and the other end of the arm 486 extends outwardly of the pincers housing 480 and below the fixed upper jaw 484. The outwardly extending end of the arm 486 is formed into a lower jaw 490 and the inwardly extending end of the arm 486 is formed into a clevis 492. Formed in the extending end of the pincers housing 480 is a guideway 494 in which an actuating slide 496 is slidably contained. One end of the actuating slide 496 is contained interiorally of the pincers housing 480 and the other end of the actuating slide 496 protrudes beyond the end of the fixed upper jaw 484. The end of the actuating slide 496 which is contained within the pincers housing 480 is formed itno a clevis 498. A link 500 is contained within the slot 482 and is pivoted to the clevis 498 by means of the pin 502 and to the clevis 492 by means of the pin 504. When the pincers jaws 478 are in the open position (see FIG. 17A) the link 500 is inclined such that the pin 504 is located more forwardly than the pin 502. It may thus be seen that when the pincers jaws 478 is carried towards the tape guide block 388, the protruding end of the actuating slide 496 may abut the tape guide block 388 so that continued rearward movement of the pincers housing 480 may cause the actuating slide 496 to slide forwardly in the guideway 494 with respect ot the pincers housing 480. This movement of the actuating slide 496 causes the link 500 to pivot about the pin 502 (in a clockwise direction as seen in FIG. 17A) so as to impart a downward component of motion to the arm 486 at the pin 504, thus causing the lower jaw 490 to pivot upwardly (clockwise as seen in FIG. 17A) towards the fixed upper jaw 484 to thereby close the pincers 478. The dimensions of the actuating slide 496, link 500, arm 486 and the pins 502, 504 connecting them are such that when the actuating slide 496 has been moved forwardly in the guideway 494 and the pincers 478 are completely closed, the pins 502, 504 are in vertical alignment with each other, the effect of which is to lock the pincers jaws 478 in a closed position and preclude opening thereof by application of a force applied to the lower jaw 490. The pincers jaws 478 may be opened by means of abutment of the upwardly extending end 506 and the link 500 with the abutting end 468 of either of the pincers deactivators 466, 467 which will cause a counterclockwise pivoting of the link 500 (as seen in FIG. 17A) to thereby pivot the lower jaw 490 downwardly and away from the fixed upper jaw 484.

In summary, when the apparatus is in an idle condition, the piston rod 35 is retracted into the motor 34 to maintain the heelgage 44 in its toeward and operating position for reception of the heel end of the shoe assembly. The piston rod 60 of the motor 62 is extended outwardly therefrom so that the toe slide 56 and the devices mounted thereto may be spaced toewardly of the shoe assembly when it is initially presented to the machine. The piston rod 124 of the motor 120 is retracted therein to maintain the deflecting members 104, 105 in their most heelward and upwardly extending position in readiness to engage the toe end of the shoe assembly. The piston rod 108 of the motor 110 is extended outwardly therefrom to cause the wedge 106 to be interposed between the nut 96 and the platform 64, thereby locking the deflecting members 104, 105 in their aforesaid heelward position. The piston rod 82 of the motor 76 is retracted therein to maintain the toe holddown 74 in its upward and out-of-the-way position. The control circuit of the machine may be of any conventional electro-pneumatic design adapted by one skilled in the art to cause actuation of the various mechanisms in the desired described sequence and is therefore neither disclosed nor claimed herein.

With the apparatus in the above described idle position, a last L having an insole I located on and in general alignment with the bottom thereof, is placed, bottom-up, therein with the heel end thereof on the heel block 48 and the toe end thereof extending towards the toe support 66, the forepart of the last L being held by the operator above the level of the toe supporting surface 68. As the shoe assembly is so placed in the apparatus it may simultaneously be urged heelwardly to bring the bottom periphery of the heel end of the last L to bear against the diverging inner surfaces of the heel gage 44. When the operator has determined that the shoe assembly is properly disposed, as above, he then urges the shoe assembly downwardly against the heel block 48 to actuate the switch 52. The switch is integrated into the control circuit of the apparatus in such a manner as to activate the motor 62 to move the toe slide 56 heelwardly towards the toe end of the shoe assembly. As the toe supporting surface 68 of the toe support bracket 66 is thus moved towards the shoe assembly and underneath the forepart thereof the operator may allow the forepart of the last to rest on the surface 68 so that the surface 68 may continue to slide thereunder. The surface 66 is of a material having a coefficient of friction with respect to the last L such that if the operator had previously neglected to bring the heel end of the bottom periphery of the last L to properly bear against the diverging surfaces of the heel gage 44, the heelward movement of the toe slide 56 may cause the surface 68 to frictionally urge the last L towards and into engagement with the heel gage 44. As the shoe assembly is urged towards the heel gage 44, any portions of the heel end of the insole I that overlap and extend beyond the bottom periphery of the heel end of the last L may be displaced, by means of engagement with the divergent surfaces of the heel gage 44, into substantial alignment with the heel end of the bottom of the last L.

With the heel end of the last L embraced by and in abutment with the divergent legs of the heel gage 44, the heelward movement of the toe slide 56 is continued to bring the deflecting members 104, 105 to bear against the toe end of the shoe assembly. As the deflecting members 104, 105 move heelwardly they may engage the edge of any misaligned forepart portions of the insole I that extend beyond the bottom periphery of the forepart of the last L and displace those misaligned forepart portions into alignment with the last bottom. If, when the shoe assembly was initially introduced to the apparatus the heel end of the insole I was misaligned in a toeward direction on the last bottom and thus did not extend beyond the bottom periphery of the heel portion of the last L, the heelward movement of the deflecting members 104, 105 may, after engagement thereof with the edge of the forepart of the insole I, urge the insole I heelwardly into engagement with the heel gage 44 at the same time as it is displacing the forepart of the insole I into alignment with the last bottom.

When the heel end of the last L is in abutment with the legs 44 of the heel gage 38 and the deflecting members 104, 105 are in engagement with the heelwardly diverging periphery of the forepart of the last bottom, the insole I will be in superposed and final alignment with the last bottom. The motor 62 is maintained in its actuated condition after the insole I and last L are in final alignment to continue to move the toe slide 56 heelwardly thereby urging the deflecting member 104 laterally in a forward direction to effect the actuation of the switch 132. The switch 132 is integrated into the control circuit of the machine in such a manner as to cause deactuation of the motor 62 to arrest the heelward movement of the toe slide 56 and at substantially the same time, cause actuation of the motor 76 to bring the toe holddown 74 downwardly against the insole bottom thus holding the toe portion of the insole I against the last bottom.

With the last L and insole I in final alignment and being securely supported in the machine, the motors 154 are then actuated to bring the tape strips and insole pressing and molding device 178 downwardly and into engagement with the shoe assembly. The control circuit of the machine may be so constructed as to effect actuation of the motors 154 automatically after the last L and insole I have been finally aligned and securely supported or to require the operator to manually actuate the motors 154 as by a separate switch or other triggering device. The latter configuration would permit the operator to inspect the shoe assembly to insure that it is properly disposed and aligned. Upon actuation of the motors 154, the support members 158, 162 are moved downwardly simultaneously to carry the hangers 170 with the tape strips S supported therein and the insole pressing and molding devices 178 towards the bottom of the shoe assembly. It should be noted that the tape strips S which are to be applied to the shoe assembly in any given cycle of the machine are fabricated and drawn forwardly into the curled ends 172 of the hangers 170 during the preceding cycle of the machine so that when a shoe assembly is presented to the machine the tape strips S which are to be applied thereto will be in a position to be applied directly when the motors 154 are actuated. The control circuit is constructed accordingly so that the tape strip fabricating mechanisms 256 and 258 are actuated towards the end of the operating cycle of the machine and the pincers jaws 366 or 478 are not caused to draw the tape ribbons forwardly into the supporting hangers 170 until the last L and insole I which are in the machine during that cycle have been assembled. Thus when the machine is in an idle condition the tape strips S will be supported in the hangers in readiness for presentation of a shoe assembly to the machine.

If the shoe assembly is of a size or shape such that the forepart portion thereof is relatively narrow, it may be necessary for the deflecting members 104, 105, in order to properly align the last L and insole I, to move heelwardly a distance such that they may be located beneath the pressing blocks 188. In order to preclude mechanical interference therebetween when the pressing blocks 188 are moved downwardly toward the shoe assembly the control circuit causes actuation of the motor 110 to move the piston rod 108 thereof toewardly thus removing the wedge 106 from its locking position between the platform 64 and the nut 96 and causes actuation of the motor 120 to move the piston rod 124 thereof heelwardly, thus causing the nuts 94, 96 and the deflecting members 104, 105 mounted thereto to pivot toewardly to an out of the way position.

Figure 34:
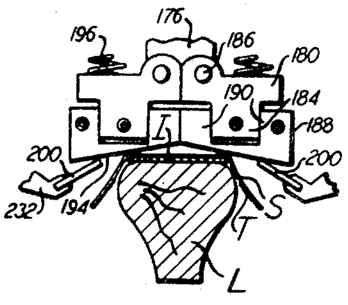
FIGURE 34 is a somewhat diagrammatical side view of the tape strip pressing and insole molding device as it initially engages the shoe assembly in the breastline portion of the shoe assembly.
Figure 35:
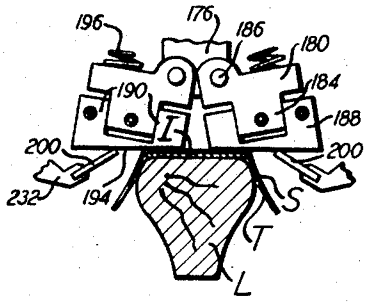
FIGURE 35 is a somewhat diagrammatical side view of the tape strip pressing and insole molding device similar to that of FIGURE 34 but after it has been urged downwardly into full engagement with the bottom of the shoe assembly.
Figure 36:
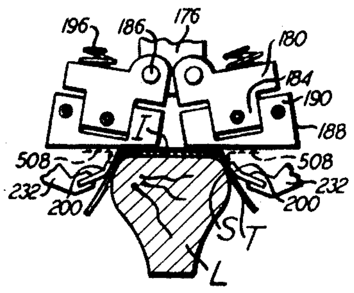
FIGURE 36 is a somewhat diagrammatical side view of the tape strip pressing and insole molding device illustrating the path of movement of the fingers thereof when actuated to press the tape ends to the sides of the last.

The movement of the support members 158 downwardly towards the shoe assembly causes the hangers 170 to apply the adhesive midportions A of the tape strips S transversely to the bottom of the insole I. Further downward movement of the support members 158, 162, in response to continued actuation of the motors 156, is effective to move the hangers 170 downwardly so as to free them from engagement with the ends of the tape strips S and to bring the pressing surfaces 194 of the pressing members 188 to bear against the bottom of the insole I. Referring to FIGS. 34, 35 and 36 the inclined pressing surfaces 194 of the pressing blocks 188 initially engage the insole I at the edge thereof, the motors 154 being continually actuated to thereafter cause substantially all of the pressing surface 194 to engage the insole I. After the aforesaid initial engagement of the pressing blocks 188 and the insole I, the continued downward movement of the support members 158, 162 causes the pressing surfaces 194 of the pressing blocks 188 to substantially assume the contour of the bottom of the last L, thereby pressing the insole I to a corresponding contour therebetween. The pressing surfaces 194 are free to substantially assume such a contour by means of the aforesaid limited universal mounting thereof. The compression springs 196 are effective throughout the interval during which the pressing members 188 are in contact with the insole I to maintain the pressing surfaces 194 in firm pressing contact with the peripheral marginal portion of the insole I. In addition to deformably molding the insole I to the contour of the bottom of the last L, the pressing blocks 188 that are mounted to the most heelward and toeward support members 158 firmly press the tape strip S midportion into adhesion with the insole bottom.

The utility of the limited universal mounting of the pressing blocks 188 and the inclination of the pressing surfaces 194 thereof may be more clearly seen in FIGS. 37 and 38 in which the deformative molding of the shank portion of the insole I is illustrated. The shape of the bottom of most lasts is such that the heel and breastline portion is relatively flat (see FIGS. 34, 35 and 36) whereas the shank portion is of a more rounded contour, so that when the flat, unmolded insole I is located on the bottom of the last L, at least the marginal portion of the shank of the insole I will be spaced heightwise of corresponding portions of the last bottom. Thus as the pressing blocks 188 are carried downwardly towards the shoe assembly in response to actuation of the motors 154, the inclined pressing surfaces 194 thereof engage the insole I at the peripheral edge thereof and press the peripheral edge downwardly against the bottom of the last L. When the pressing blocks 188 have so urged the peripheral edges of the insole I firmly against the last bottom solely downward movement of the pressing blocks 188 is arrested so that continued actuation of the motor 154 may cause a compound movement of the pressing blocks 188 wherein the pressing blocks 188 simultaneously pivot away from each other about the pins 186 and move downwardly to bring substantially all of the pressing surfaces 194 to bear against the bottom of the insole I. During this compound movement that portion of the pressing surfaces 194 that is in direct contact with the insole bottom will slide therealong in a lateral direction which is away from the insole I and may thus aid in the deforming process. The molding pressure of the pressing block 188 is maintained substantially uniform along the pressing surfaces 194 by means of the above described compression spring. It should be noted that in FIGS. 34, 35 and 36, the illustrated last L is of relatively small size to more clearly show the path of movement of the fingers 200.

When the pressing blocks 188 are fully engaged with the insole I the motors 206 are actuated to move the fingers 200 into engagement with the sides of the shoe assembly and press the ends of the tape strips S to the sides of the last L. In order to insure that the movement of the fingers 200 against the shoe assembly will not disturb the alignment of the last L and insole I, the motors 206 are not actuated until all the pressing members 188 are in pressing engagement with the insole I. This is accomplished by means of the switch 507 and plunger 509 which are mounted to the heelwardmost support member 158 for engagement with the heel end of the bottom of the insole I (see FIGURE 14). Inasmuch as the mode of support of shoe assemblies in the machine will cause the heel end thereof to be located at a lower elevation than the other portions thereof the heelwardmost pressing blocks 188 will engage the insole bottom after the other pressing blocks 188 have been so engaged. Thus the switch 507 may not be triggered by means of abutment of the plunger 509 with the insole bottom until the heelwardmost pressing blocks 188 are in engagement with the insole I. If the shape and style of the particular shoe assembly is such that the heel end thereof is not located at a considerably lower elevation than the other portions of the shoe assembly, the heelwardmost pressing block 188 may be retarded in its movement towards the insole bottom by interposing a restrictor or flow control valve (not shown) in that portion of the control circuit that operates the motor 156 associated with the heelwardmost pressing blocks 188, thus retarding the speed of and precluding engagement of the plunger 509 and heelwardmost pressing blocks 188 with the insole until the other pressing blocks 188 have become so engaged. The switch 507 is so interposed in the control circuit of the machine as to cause actuation of the motors 206 upon actuation of the switch 507 by the plunger 509.

When the motors 206 are actuated to urge the piston rod 208 thereof downwardly, the fingers 200 are caused to move inwardly towards and into abutment with the tape strips S and the shoe assembly, being guided in this movement by means of the aforementioned cooperation of the arm 220, the slot 224 formed therein, the pin 226 and the tension spring 228. Upon abutment of the fingers 200 with the shoe assembly continued actuation of the motors 206 causes the fingers 200 to move downwardly in continuous pressing contact with the sides of the last L to thereby press the adhesive portions of the tape strip ends into adhesion with the last L, thus securing the insole I to the last L. The fingers 200 follow a path indicated by the broken arrows 508 of FIGURE 36.

After the last L and insole I have been so secured the control circuit of the machine actuates the motors 156 and 206 to retract the support members 158, 162 and the fingers 200 to their upward, out-of-the-way position. At substantially the same time the control circuit causes actuation of the motors 76, 62 and 34 to respectively pivot the toe holddown 74 upwardly and out of engagement with the insole I, move the toe slide 56 toewardly away from the shoe assembly, and pivot the heel gage 38 heelwardly away from the shoe assembly to thereby release the shoe assembly so that it may be removed from the machine.

As mentioned earlier the tape strips S are drawn into position in the tape guides 168 at the end of each cycle of operation of the machine so as to be in readiness for the subsequently presented shoe assembly and to avoid interference between the pincers jaws 366 or 478 and the insole pressing and molding mechanism. The backing strip applying mechanisms, however, being disposed in the machine so as to be incapable of mechanical interference with any other mechanism, may be actuated at any time during the cycle of operation of the machine prior to the operation of the pincers jaws 366 or 478 to draw the tape ribbon R into position in the tape guides 168. Thus, at some time between the introduction of the shoe assembly into the machine and actuation of the motors 154 to raise the pressing blocks 188 from the shoe assembly, the control circuit causes actuation of the motors 346 such that the piston rods 348 are initially driven outwardly thereof and immediately retracted inwardly, the clutch 344 slipping during the outward movement of the piston rods 348 and becoming locked during the inward movement of the piston rod 348 to thus cause the rollers 334, 335 to rotate in a direction that is towards the housing 266. The paper ribbon P which is interposed between the rollers 334, 335 is thus advanced towards and into the housing 266. The paper P is guided through the housing 266 between the pin 286 and the anvil 280 so that it is spaced between the anvil 280 and the adhesive side of the tape ribbon R, the rollers 334, 335 having rotated an amount sufficient to advance the leading edge 288 of the paper ribbon P beyond the edge of the tape ribbon R such that the paper ribbon P completely overlaps a length of the tape ribbon R.

The timing of the control circuit of the machine is such that after the paper ribbon P has been advanced, motor 320 is actuated to move the hammer 306, with the knife 310 and retaining pins 322 towards the anvil 280. As the hammer 306 advances towards the anvil 280, the retaining pins 322 engage the tape ribbon R and overlapping end of the paper ribbon P and press them against the anvil 280 to thus maintain them in their overlapping relationship during the subsequent pressing and cutting operations. As the hammer 306 continues to advance towards the anvil 280 the retaining pins 322 retract therein and the pressing surface 308 of the hammer 306 presses the tape ribbon R and paper ribbon P into adhesion. At approximately the same time as the paper and tape ribbons P, R are being so pressed, the knife 310 engages the knife 316 to sever the adhered portion of the paper ribbon P from the remainder thereof. After the backing strip B has been so applied the control circuit of the machine causes actuation of the motor 302 to withdraw the hammer 306 and the devices mounted thereto to their original, idle positions, away from the anvil 280, thus permitting the tape ribbon R with the backing strip B adhered thereto to be withdrawn downwardly out of the housing 266 upon actuation of the tape advancing mechanism.

After the backing strip B has been applied to the tape ribbon R and the motors 156 have been actuated to withdraw the support members 158, 162 and the mechanisms mounted thereto upwardly to their out-of-the-way, idle position, the control circuit of the machine causes the motor 368 to be actuated to move the cylinder 372 thereof forwardly. Such actuation of the motor 368 is effecting by means of the cables 374 and pullers 378 to move the trolleys 360, support bar 364 and thus the open pincers jaws 366 or 478 rearwardly through the tape guides, across the table 4 between the open knives 310, 316 and into the slot 400 formed in the tape guide block 388, where the free end of the tape ribbon R (having a tab T formed thereon) is located. As the pincers jaws 366 or 478 are carried into the slot 400, the upper and lower jaws thereof initially embrace the free end of the tape ribbon R and the protruding end of the actuating slide 454 or 446 is brought into abutment with the end of the stop bolt 401. With movement of the actuating slide 454 or 496 having been arrested by means of its abutment with the stop bolt 401 the continued actuation of the motor 368 causes the pincer housing 428 or 480 to continue its rearward movement, thus causing the pincers jaws 366 or 478 to close about and grip the free end of the tape ribbon R, the rearward movement of the pincers housing terminating upon closure of the jaws associated therewith. When the pincers jaws 366 or 478 have closed they are caused to be locked in such a closed position either by means of the aforementioned hooked spring 460 or the vertical alignment of the pins 502 and 504, depending on whether the pincers jaws 366 or pincers jaws 478 is being used in the machine.

When the free ends of the tape ribbon R have been so gripped and the pincers jaws 366 or 478 locked, the control circuit of the machine causes the motor 368 to be actuated to move the cylinder 372 thereof rearwardly, thereby drawing the pincers jaws 366 or 478 forwardly and laterally over the shoe assembly, through the tape guides 168 and into engagement with the pincers deactivators 466, 467, so as to draw the tape ribbon R forwardly therewith through the tape guides 168 so that the edges of the tape ribbons R may be contained within the curled ends 172 of the tape guides 168. The breastline pincers deactivator 466, extending more rearwardly than the ballbreak pincers deactivator 467, is thus the first to engage its associated pincers jaws 366 or 478. As the support bar 364 is moved forwardly the upwardly extending leg 450 of the bellcrank 442 or the upwardly extending end of the link 500, depending on the type of pincer jaws used, is brought into engagement with the abutting end 468 of the breastline pincers deactivator 466 thereby arresting the purely forward movement of the bellcrank 442 or link 500 whereupon continued actuation of the motor 368 may continue to carry the support bar 364 and pincers housing 428 forwardly thereby causing the bellcrank 442 or link 500 to pivot in the aforementioned manner to cause lower pincer jaw 438 or 490 to pivot downwardly away from the fixed upper pincer jaw 432 or 484 and thus open the pincer jaws 366 or 478. As the pincer jaws 366 or 478 is opened the breastline tape ribbon R is released. As mentioned above, the abutting end 468 of each of the pincer jaws deactivators 466, 467 is adjusted so that when the tape ribbon R is released the tape strip S portion thereof will be properly disposed above the shoe assembly and with respect to the cutting plane of the scissor blades 414. The spring 474 is of such strength as to be able to substantially resist forward movement of the rod 470 as the pincers jaws 366 or 478 are being opened but to yield and permit such forward movement after the pincers jaws have been opened and the tape ribbon R released, thus permitting the support bar 364 to continue its forward movement to the ballbreak pincers deactivator 467.

After the breastline tape ribbon R has been released the ballbreak tape ribbon R continues to be drawn forwardly until the bellcrank 442 or link 500 of the ballbreak pincers jaws 366 or 478 engages the abutting end 468 of the ballbreak pincers jaws deactivator 467 to thus cause the ballbreak pincers jaws to open and release the ballbreak tape ribbon R in the same manner as above described for the breastline pincers jaws 366 or 487. The abutting end 468 of the ballbreak pincers deactivator 467 is similarly adjusted to extend rearwardly a predetermined distance so as to cause the ballbreak tape ribbon R to be of the desired greater length and released in proper disposition with respect to the shoe assembly. When the ballbreak pincers jaws 366 or 478 has fully opened the forward movement of the support bar 364 is arrested by means of the abutting engagement of the ballbreak pincers jaws deactivator 467 and the bellcrank 442 or link 500. In order to prevent damaging of the ballbreak pincers jaws 366 or 478 the stop bolt 380 may be adjusted so as to engage the support bar 364, to terminate its forward movement, when the ballbreak pincers jaws 366 or 478 has opened an amount sufficient to release the tape ribbon R advanced thereby.

After the motor 368 has caused the pincers jaws 368 to so advance the tape ribbons R, the control circuit of the machine causes actuation of the motors 408 to initially draw each piston rod 410 inwardly thus effecting a cutting stroke of the blades 414 and severing the tape strips from the remainder of the tape ribbons R, and immediately thereafter urge the piston rods 410 thereof outwardly to return the blades 414 to their idle, open position. When the severance of the tape strips S is complete a fresh shoe assembly may be introduced into the machine and the cycle started anew.

We claim:

1. A shoe machine for assembling an insole and a last comprising:

a frame;

means mounted to said frame for supporting said last in a bottom-up position and in such a manner that said insole is located in superposed position on the bottom of said last;

tape strip applying means mounted to said frame above and for heightwise movement towards and away from said last supporting means and being adapted to apply, during said heightwise downward movement, at least one strip of pressure sensitive tape to the bottom and transversely of said insole and in such a manner that the ends of said tape strip extend laterally beyond the edges of said insole and with the adhesive surface of the midportion of said tape strip contacting said insole;

pressing means mounted to said frame above and for heightwise movement towards and away from said last supporting means and being engageable with said insole bottom, said pressing means being so constructed and arranged as to press said insole, upon engagement therewith, to said last bottom under a force of magnitude sufficient to simultaneously cause said insole to be deformably molded to the contour of the last bottom and to press said applied tape strip midportion into adhesion with the bottom of said insole; and tape end pressing means mounted to said frame for movement with respect to said last supporting means from an initial position that is spaced from said last to a position that is below the level of said pressing means when said pressing means are in engagement with said insole bottom, said tape end pressing means being in engagement with the sides of the last in the regions of said laterally extending tape strip ends to thereby press said tape strip ends into adhesion with said last.

2. A shoe machine for assembling an insole and a last comprising:

a frame;

means mounted to said frame for supporting said last in a bottom-up position and in such a manner that said insole is located in superposed position on the bottom of said last;

tape strip applying means mounted to said frame above and for heightwise movement towards and away from said last supporting means and being adapted to apply, during said heightwise downward movement, at least one strip of pressure sensitive tape to the bottom and transversely of said insole and in such manner that the ends of said tape strip extend laterally beyond the edges of said insole and with the adhesive surface of the midpoint of said tape strip contacting said insole;

pressing means mounted to said frame above and for heightwise movement towards and away from said last supporting means and being engageable with said insole bottom, said pressing means being so constructed and arranged as to press said insole, upon engagement therewith, to said last bottom under a force of magnitude sufficient to simultaneously cause said insole to be deformably molded to the contour of the last bottom and to press said applied tape strip midportion into adhesion with the bottom of said insole; and tape end pressing means mounted for heightwise and yieldable inward movement with respect to said last supporting means such that said tape end pressing means may be moved from an initial position that is spaced from said last inwardly into engagement with the sides of said last in the regions of said laterally extending tape strip ends and thereafter be moved heightwise along the sides of the last, with said tape end pressing means being continually and yieldably urged inwardly against the sides of said last during said heightwise movement to thereby press said laterally extending tape strip ends into adhesion with said last.

3. A machine as recited in claim 2 wherein said means for pressing the midportion of said tape strip to said insole bottom comprises:

a support member spaced above said last supporting means and being mounted to said frame for movement in a direction that is towards and away from the bottom of said insole;

drive means operatively connected to said support member for effecting said movement thereof; and at least one pressing member mounted to the underside of said support member for movement therewith and having a pressing surface formed at the bottom thereof which faces and is located above that portion of the insole to which said tape strip is to be applied whereby upon activation of said drive means said pressing surface of said pressing member may be moved downwardly towards said applied tape strip to press the midportion thereof into firm adhesion with the insole bottom.

4. A machine as recited in claim 3 wherein said means for pressing the laterally extending ends of said tape strip to the sides of said last comprises:

a link, moveably mounted to said support member and being located on each side thereof so as to be spaced above and laterally of the sides of said last, each of said links having a downwardly extending leg;

a finger mounted to the lower end of each of said downwardly extending legs and extending inwardly towards said last and insole;

guide means operatively engaged with said links and being so constructed and arranged as to guide said links so that said fingers may initially move inwardly into abutment with the sides of said last and subsequently move downwardly along and in continuous contact with the sides of said last to thereby press the free ends of said tape strip thereto; and drive means operatively connected to said links for effecting said movement thereof.

5. A machine as recited in claim 4 wherein said link has an upwardly extending arm having a heightwise extending slot formed therein, said support member having a slot formed in each side thereof for accommodation of said upwardly extending arm, and wherein said guide means comprises:

a pin secured to each side of said support member and traversing said slot formed therein, each of said pins also being contained within the heightwise extending slot formed in the arm of its associated link;

bias means connected to said arm for urging said arm upwardly such that said pin is in abutment with the bottom of said heightwise extending slot, said drive means being pivotally connected to said link at a pivot point which is located outwardly of said upwardly extending arm thereof and being so constructed and arranged as to impart a substantially downward force to said link at said pivot point, said bias means being effective to maintain the bottom of said heightwise extending slot in abutment with said pin thereby precluding downward movement of said link and restricting said link to pivotal movement about said pin, whereby upon actuation of said drive means, the downwardly extending leg of said link may pivot inwardly about said pin to bring said fingers into abutment with said last, said inwardly pivoting movement of said link terminating upon abutment of said fingers with said last, whereupon continued actuation of said drive means may cause said link to move downwardly in opposition to the upward urging thereof by said bias means, said fingers being maintained in continuous pressing contact with the sides of said last during said downward travel of said link by means of the upwardly directed urging of said bias means.

6. A machine as recited in claim 5 wherein said drive means comprises:

a fluid actuated motor located on each side of and being mounted to the upwardly extending and of said support member, each of said motors having a downwardly extending piston rod; and a drive bar, rigidly secured at one end thereof, to the downwardly extending end of said piston rod and being pivotally connected at its other end to said link.

7. A machine as recited in claim 6 further comprising:

a leaf spring secured at one end thereof to said drive bar and having the free end thereof in contact with the downwardly extending end of said link in such a manner that said link and said finger mounted thereto is biased inwardly thereby insuring that said fingers may press the ends of said tape strip to said last under sufficient pressure during the downward travel of said fingers.

8. A machine as recited in claim 2 wherein said means for pressing the midportion of said tape strip to said insole bottom comprises:

a support member spaced above said last supporting means and being mounted to said frame for movement in a direction that is towards and away from the bottom of said insole;

drive means operatively connected to said support member for effecting said movement thereof;

a pair of pressing members mounted to the underside of said support member for movement therewith and for limited universal movement with respect thereto, each of said pressing members having a pressing surface formed at the bottom thereof which faces and is located above at least that portion of the insole to which said tape strip is to be applied whereby upon actuation of said drive means said pressing surfaces of said pressing members may be moved downwardly towards said applied tape strip to firmly press the midportion thereof into adhesion with said insole bottom and to press the insole against the last bottom so as to mold it to the contour thereof, said limited universal mounting of said pressing members being effective to permit the pressing surfaces thereof to assume a contour substantially corresponding to that of the last bottom so that the insole may be so molded therebetween.

9. A machine as recited in claim 8 further comprising:

bias means interposed between said support member and said pressing members for continually urging said support members downwardly towards said insole bottom so that said pressing surfaces thereof may be maintained in substantially continuous contact with said insole bottom when brought to bear thereagainst.

10. A shoe machine as recited in claim 2 wherein said means for pressing the laterally extending ends of said tape strip to the sides of said last comprises:

a support member spaced above said last supporting means and being mounted to said frame for movement towards and away from the bottom of said insole;

drive means operatively connected to said support member for effecting said movement thereof;

a link moveably mounted to said support member and being located on each side of said support member so as to be spaced above and laterally of each side of said last and insole, each of said links having a downwardly extending leg;

a finger, mounted to the lower end of each of said downwardly extending legs and extending inwardly towards said last and insole;

guide means operatively engaged with said links and being so constructed and arranged as to guide said links so that said fingers may initially move inwardly into abutment with the sides of the last and subsequently move downwardly along and in continuous contact with the sides of the last to thereby press the free ends of said tape strip thereto; and drive means operatively connected to said link for effecting said movement thereof.

11. A machine as recited in claim 10 wherein said link has an upwardly extending arm having a heightwise extending slot formed therein, said support member have a slot formed in each side therof for accommodation of said upwardly extending arm, and wherein said guide means comprises:

a pin, secured to each side of said support member and traversing said slot formed therein, each of said pins also being contained within the heightwise extending slot formed in the arm of its associated link;

bias means connected to said arm for urging said arm upwardly such that said pin is in abutment with the bottom of said heightwise extending slot, said drive means being pivotally connected to said link at a point which is located outwardly of said upwardly extending arm thereof and being so constructed and arranged as to impart a substantially downward force to said link at said pivot point, said bias means being effective to maintain the bottom of said heightwise extending slot in abutment with said pin thereby precluding downward movement of said link and restricting said link to pivotal movement about said pin, whereby upon actuation of said drive means, the downwardly extending leg of said link may pivot inwardly about said pin to bring said fingers into abutment with said last, said inwardly pivoting movement of said link terminating upon abutment of said finger with said last, whereupon continued actuation of said drive means may cause said link to move downwardly in opposition to the upward urging thereof by said bias means, said fingers being maintained in continuous pressing contact with the sides of said last during said downward travel of said link by means of the upwardly directed urging of said bias means.

12. A machine as recited in claim 11 wherein said drive means comprises:

a fluid actuated motor located on each side of and being mounted to the upwardly extending end of said support member, each of said motors having a downwardly extending piston rod; and a drive bar rigidly secured at one end thereof to the downwardly extending end of said piston rod and being pivotally connected at its other end to said link.

13. A machine as recited in claim 12 further comprising:

a leaf spring secured at one end thereof to said drive bar and having the free end thereof in contact with the downwardly extending end of said link in such a manner that said link and said finger mounted thereto is biased inwardly thereby insuring that said fingers may press the ends of said tape strip to said last under sufficient pressure during the downward travel of said fingers.

14. A machine as recited in claim 2 wherein said tape strip applying means comprises:

tape strip supporting means spaced above said last supporting means and being so constructed and arranged as to releasably support at least one strip of pressure sensitive tape above and transversely of said last and insole and in such a manner that the ends of said tape strip extend laterally beyond the edges of said insole with the adhesive side of said tape strip facing said insole;

means mounting said tape strip supporting means to said frame for movement in a direction which is towards and away from said last and insole to apply the midportion of said tape strip to said insole bottom, said tape strip supporting means being operative to release said tape strip when it has been applied to said insole; and drive means operatively associated with said tape strip supporting means for effecting said movement thereof.

15. A machine as recited in claim 14 wherein said tape strip supporting means comprises:

a pair of downwardly extending and opposed hangers located above and laterally of each side of said last, the lowermost ends of each of said hangers being curled towards its opposed hanger of the pair, said curled ends of each pair being spaced a distance corresponding to the width of said tape strip so that said tape strip may be supported at its edges therebetween, said curled ends of both pairs of hangers being so oriented as to support said tape strip transversely of said last and insole.

16. A shoe machine for assembling an insole and a last comprising:

a frame;

means for supporting said last in a bottom-up position and in such a manner that said insole is located in superposed position on the bottom of said last and being mounted on said frame;

tape strip applying means supported on said frame and being so constructed and arranged as to apply a strip of pressure sensitive tape to both the breastline and ballbreak regions of the bottom of said insole in such a manner that the ends of each of said tape strips extend laterally beyond the edges of said insole and with the adhesive surface of the midportion thereof against said insole;

a plurality of support members spaced above and lengthwise of said last supporting means and being mounted to said frame for independent movement with respect to each other in a direction that is towards and away from insole bottom;

drive means operatively connected to each of said support means for effecting said movement thereof;

at least one pressing member mounted to the underside of each of said support members for movement therewith and having a pressing surface formed at the bottom thereof which faces said insole bottom, said support members and said pressing members being so arranged that at least two of said pressing members are respectively located above said breastline and said ballbreak portions of said insole whereby upon actuation of said drive means said pressing members may be independently moved downwardly into pressing engagement with said insole so as to deformably mold said insole to the contour of the bottom of said last, said pressing members which are located above said breastline and ballbreak portions of said insole being additionally effective to press the midportions of said tape strips into adhesion with said insole bottom; and tape end pressing means mounted for heightwise and yieldable inward movement with respect to said last supporting means such that said tape end pressing means may be moved from an initial position that is spaced from said last inwardly into engagement with the sides of said last in the regions of said laterally extending tape strip ends and thereafter be moved heightwise along the sides of said last, with said tape end pressing means being continually and yieldably urged inwardly against the sides of said laterally extending tape strip ends into adhesion with said last.

17. A machine as recited in claim 16 wherein said means for pressing the laterally extending ends of said tape strip to the sides of said last comprises:

a pair of breastline links moveably mounted to and being located respectively on each side of said support member so as to be spaced above and laterally of each side of said last and insole, each of said breastline links having a downwardly extending leg;

a pair of ballbreak links moveably mounted to and being located respectively on each side of said support member so as to be spaced above and laterally of each side of said last and insole, each of said ballbreak links having a downwardly extending leg;

a finger, mounted to the lower end of each of said downwardly extending legs and extending inwardly towards said last and insole, said fingers which are mounted to said breastline links being adapted to engage the sides of said last adjacent to the region of the breastline and said fingers which are mounted to said ballbreak links being adapted to engage the sides of said last adjacent to the ballbreak region;

guide means operatively engaged with said links and being so constructed and arranged as to guide said links so that said fingers may initially move inwardly into engagement with their associated tape strips and the sides of said last and subsequently move downwardly along and in continuous contact with the sides of the last to thereby press the free ends of said tape strips thereto; and drive means operatively connected to said links for effecting said movement thereof.

18. A machine as recited in claim 17 wherein said fingers are formed from a resilient, flexible material.

19. An apparatus for locating an insole on a last bottom in superposed relation thereto comprising:

a table;

a heel support mounted to said table and being adapted to support the heel end of said last in a bottom-up position;

a toe support mounted to said table for movement between a first position which is towards said heel support and a second position which is away from said heel support, said toe support being so constructed as to continually support the toe end of said last in a bottom-up position during said movement thereof;

drive means for effecting said movement of said toe support;

a heel gage mounted to said heel support and having laterally spaced portions thereof extending towards said toe support, said extending portions being disposed so as to be located on each side of and embracing the heel end of said last such that when said last is supported on said heel support each of said embracing portions may contact the periphery of the bottom of said last on opposite sides of the heel end thereof, said embracing portions extending upwardly beyond said heel support so that when said last is supported on said heel support said insole may be located on said last bottom in general alignment therewith whereupon said last and insole may be moved towards and into contact with said heel gage, said heel gage being effective to engage any misaligned portions of the heel end of said insole and to displace said misaligned portions into substantial alignment with the heel end of said last; and a toe gage mounted to said toe support for movement therewith, said toe gage including at least two laterally spaced deflecting members extending upwardly of said toe support such that when said last is supported on said heel and toe support said toe support may be moved in a heelward direction to bring said deflecting members to bear against the periphery of the bottom of said last, said deflecting members being effective, during their movement towards said last to engage any misaligned portions of the toe end of said insole and to displace said misaligned portions into alignment with the toe end of said last, said heelward movement of said toe support and toe gage being further effective to urge said last and insole into contacting relation with said heel gage whereby said heel and toe gages may cooperate in alining said insole on said last bottom.

20. An apparatus as recited in claim 19 further comprising:

means mounting said deflecting members to said toe support for pivotal movement between a first position wherein said deflecting members extend upwardly so as to be engageable with the toe end of said last and a second position wherein said deflecting members extend in a more toeward direction so as to be out of engagement with said last; and drive means for effecting said pivotal movement of said deflecting members between said first and second positions.

21. An apparatus as recited in claim 19 wherein said mounting means for said deflecting members comprises:

a platform secured to said toe support and extending laterally on both sides thereof;

a lug, mounted to said platform on each side of said toe support and extending upwardly therefrom;

a shaft rotatably mounted at its ends to said lugs and extending laterally on both sides of said toe support, said deflecting members being mounted to said shaft for rotation therewith and extending upwardly beyond said toe support; and means actuable to preclude rotation of said deflecting members.

22. An apparatus as recited in claim 19 further comprising:

a toe hold-down located upwardly of said toe support and being mounted thereto for movement towards and away from the uppermost end of said toe support and being operative to rigidly clamp the toe of said insole and last in position therebetween; and drive means for effecting said movement of said toe holddown.

23. An apparatus as recited in claim 19 further comprising:

a platform secured to said toe support and extending laterally on both sides thereof;

a shaft rotatably mounted at its ends to said platform such that the portion thereof intermediate its ends is spaced above said platform and extends laterally of both sides of said toe support, each of said laterally extending portions of said shaft being threaded in an opposite direction than the other portion thereof;

a nut threaded onto each of said laterally extending portions of said shaft;

a guide bar, secured to one of said nuts and extending towards the other of said nuts, said other of said nuts having a hole formed therein for sliding accommodation of said guide bar, said extending end of said guide bar being slidably contained within said hole thereby precluding rotation of one nut with respect to the other, whereby said shaft may rotate in unison with said nuts;

lock means actuable to preclude rotation of said nuts whereby upon actuation of said lock means, rotation of said shaft may cause said nuts to travel in opposite directions along said shaft to thereby adjust the lateral spacing between said nuts;

and wherein said deflecting members are mounted to said nuts for movement therewith; and drive means operatively connected to said nuts to effect said rotation thereof.

24. An apparatus as recited in claim 23 wherein said drive means for rotating said nuts comprises:

a drive link mounted to said toe support at a point below said nuts for pivotal movement in a heelward-toeward direction and extending upwardly therefrom, said drive link having a slot formed therein for accommodation of said guide bar, said slot and said guide bar being so arranged that as said drive members may pivot in a toeward direction and as said drive link is pivoted in a toeward direction said nuts and deflecting members may pivot in a heelward direction; and a motor mounted to said toe support and being in operative engagement with said drive link to effect said pivotal movement thereof.

25. An apparatus as recited in 23 further comprising:

a toe holdown located upwardly of said toe support and being mounted thereto for movement towards and away from the uppermost end of said toe support and being operative to rigidly clamp the toe of said insole and last in position therebetween; and drive means for effecting said movement of said toe holddown.

26. A shoe machine for performing shoe manufacturing operation on a last and insole comprising:

a frame;

last support means, mounted to said frame, and being adapted to support a last in a bottom-up position;

a heel gage mounted to said frame and having laterally spaced portions extending in a toeward direction, said toewardly extending portions being disposed so as to be located on each side of and embracing the heel end of said last such that when said last is supported on said last support means said embracing portions may contact the periphery of the bottom of said last on opposite sides of the heel end thereof, said embracing portions extending upwardly beyond said last support means so that said last having said insole located on the bottom thereof may be moved into contacting engagement with said heel gage, said heel gage being effective to engage any misaligned portions of the heel end of said insole and to displace said misaligned portions into substantial alignment with the heel end of said last;

a toe gage mounted to said frame for movement towards and away from said heel gage, said toe gage including at least two laterally spaced deflecting members extending upwardly of said last support means such that said deflecting members may be moved heelwardly to bear against the periphery of the bottom of said last, said deflecting members being effective, during their heelward movement towards said last to engage any misaligned portions of the toe end of said insole and to displace said misaligned portions into alignment with the toe end of said last, said heelward movement of said deflecting members being further effective to urge said last and insole into contacting relation with said heel gage whereby said heel gage and said deflecting members may cooperate in aligning said insole on said last bottom;

shoe manufacturing instrumentality means mounted to said frame about said last supporting means for movement engagably towards and disengagably away from said last and insole and being so constructed and arranged as to perform a shoe manufacturing operation upon said last and insole when brought towards and into engagement therewith;

drive means for effecting said movement of said shoe manufacturing instrumentality means;

means mounting one of deflecting said members for shifting movement between a first inner position and a second outer position;

means biasing said movable deflecting member in said first position whereby, upon heelward movement of said deflecting members toward the toe of said last, said movable deflecting member may be shifted to said second position by means of its coaction with bottom periphery of the toe ends of said last; and control means responsive to said shifting movement to cause actuation of said drive means so as to bring said shoe manufacturing instrumentality means toward and into engagement with said last and insole.

27. An apparatus as recited in claim 19 further comprising:
a platform secured to said toe support and extending laterally on both sides thereof;
a shaft rotatably mounted at its ends to said platform such that the portion thereof intermediate its ends is spaced above said platform and extends laterally of both sides of said toe support, each of said laterally extending portions of said shaft being threaded in an opposite direction than the other portion thereof;
a nut threaded onto each of said laterally extending portions of said shaft;
a yoke mounted to one of said nuts for rotary movement therewith and lateral movement in a direction which is towards and away from said nut, one of said deflecting members being secured to said yoke and the other of said deflecting members being secured to the other of said nuts whereby upon pivoting of said yoke said deflecting member secured thereto may pivot in a direction which is towards and away frome the other of said deflecting members;
a switch mounted to said nut and being in operative engagement with said yoke such as to be actuable in response to the lateral position thereof;
a guide bar secured to one of said nuts and extending towards the other of said nuts, said other of said nuts having a hole formed therein for sliding accommodation of said guide bar, said extending end of said guide bar being slidably contained within said hole thereby precluding rotation of one nut with respect to the other, whereby said shaft may rotate in unision with said nuts;
lock means actuable to preclude rotation of said nuts whereby upon actuation of said lock means, rotation of said shaft may cause said nuts to travel in opposite directions along said shaft to thereby adjust the lateral spacing between said nuts;
and drive means operatively connected to said nuts to affect said rotation thereof.

28. An apparatus as recited in claim 19 wherein said heel support comprises:
a heel post mounted to said table and extending upwardly therefrom;
a heel block moveably supported on said heel post for heightwise movement towards and away from said heel post; and
a switch in operative engagement with said heel block and being operatively associated with said toe support drive means such that when the heel end of said last is placed on said heel block said switch may be actuated to cause said toe support drive means to move said toe support in a heelward direction and when said last is removed from said heel block said switch may be actuated to cause said toe support drive means to move said toe support in a toeward direction.

29. An apparatus as recited in claim 28 wherein said heel post has a threaded exterior and a heightwise extending slot formed therein and wherein said heel post is mounted to said table for heightwise movement by means comprising:
a nut rotatably mounted to said table for rotation in a fixed position, said post being in threaded engagement with said nut; and
a key, secured to said table and extending into said slot in said post so that as said nut is rotated to thereby vary the height of said post with respect to said table, said key and slot may cooperate to preclude rotation of said post with respect to said table.

30. An apparatus as recited in claim 29 wherein said heel gage comprises:
a support bar supported on and extending upwardly from said heel post heelwardly of said heel block for pivotal movement in a heelward-toeward direction;
a gaging member having a pair of diverging legs so as to receive the heel end of said last therebetween, each of said legs having a surface thereof adapted to engage the bottom periphery of the heel end of said last, said gaging member being pivotally mounted to said support bar in such a manner as to permit it to be disposed at an incline with respect to the heel end of said last;
means for locking said gaging member in fixed position with respect to said support bar; and
drive means operatively connected to said support bar to effect said pivoting thereof whereby actuation of said drive means may cause said support bar and gaging member to move away from said last to permit removal thereof.

31. An apparatus as recited in claim 19 wherein said heel gage comprises:
a support bar supported on and extending upwardly from said heel post heelwardly of said heel block for pivotal movement in a heelward-toeward direction;
a gaging member having a pair of diverging legs so as to receive the heel end of said last therebetween, each of said legs having a surface thereof adapted to engage the bottom periphery of the heel end of said last, said gaging member being pivotally mounted to said support bar in such a manner as to permit it to be disposed at an incline with respect to the heel end of said last;
means for locking said gaging member in fixed position with respect to said support bar; and
drive means operatively connected to said support bar to effect said pivoting of said support bar whereby actuation thereof may cause said support bar and gaging member to move away from said last to permit the removal thereof.

32. In a machine for applying a strip of tape to a workpiece having a source of tape strips, an apparatus for locating and supporting said tape strip above said workpiece in readiness for application thereto comprising:
a pair of spaced stirrups mounted to said machine and being located above said workpiece, each of said stirrups having an opening facing the opening of the other of said stirrups and being of dimensions corresponding to the width of said tape strip such that each of said stirrups may support an end of said tape strip; and
gripping means mounted to said machine for movement above said workpiece between a first position adjacent said source of tape strips and on one side of said stirrups and a second position on the other side of said stirrups and being actuable when in said first position, to grip the end of said tape strip whereupon said gripping means may be moved to said second position thereby drawing said tape strip above and across said workpiece, said gripping means having a path of motion between said first and second position as to draw said tape strip through said stirrups so that when said gripping means is in said second position said tape strip may be suspendingly supported by said stirrups.

33. An apparatus as recited in claim 32 wherein said stirrups are mounted to said machine by means of a pair of downwardly extending hangers and wherein each of said stirrups comprises:
a curled member located at the lowermost end of each of said hangers and defining a channel having an open portion, said open portion of each of said curled members facing the open portion of the other of said curled members such that the channel of each thereof substantially parallels the channel of the other, both of said channels being so disposed as to substantially parallel and embrace said path of motion of said gripping means, said curled members being spaced an amount corresponding to the width of said tape strip so as to receive the tape strip width-wise therebetween whereby upon movement of said gripping means from said first to said second position said tape strip may be drawn along said path of motion to cause the edges thereof to be received and supported by said channels.

34. An apparatus as recited in claim 33 wherein said hangers are resiliently yieldable towards and away from each other.

35. In a machine for assembling a last and insole having means for supporting said last in a bottom-up position with said insole located in alignment with and on the bottom of said last, an apparatus for applying and pressing a tape strip to said insole bottom comprising:

insole pressing means mounted to said machine above said last supporting means for movement engageably towards and disengageably away from said insole bottom, said insole pressing means being adapted, when in engagement with said insole bottom, to press and deformably mold said insole to the contour of said last bottom; and a stirrup located on opposite sides of said last supporting means and being mounted to said insole pressing means for movement in unison therewith, each of said stirrups extending below the level of said insole pressing means and having an opening facing the opening of the other of said stirrups and being of dimensions corresponding to the width of said tape strip such that each of said stirrups may support an end of said tape strip in such a manner that said tape strip is spaced above said insole but below said pressing means whereby upon movement of said insole pressing means downwardly towards engagement with said insole bottom said stirrups may move downwardly in unison therewith thereby bringing said tape strip to bear against said insole bottom to apply it thereto whereupon continued downward movement of said insole pressing means towards said insole bottom may simultaneously cause said stirrups to be pulled away from the ends of said tape strip and move said pressing means into engagement with said insole to deformably mold said insole and press said tape strip into adhesion with said insole.

36. An apparatus as recited in claim 35 wherein said stirrups are mounted to said insole pressing means by means of a pair of downwardly extending hangers and wherein each of said stirrups comprises:

a curled member located at the lowermost end of each of said hangers and defining a channel having an open portion, said open portion of each of said curled members facing the open portion of the other of said curled members such that the channel of each thereof substantially parallels the channel of the other, said curled members being spaced an amount corresponding to the width of said tape strip so as to releasably receive the tape strip width-wise therebetween.

37. A method of securing an insole to the bottom of a last comprising:

locating said insole in superposed relation on the bottom of said last;

applying the midportion of at least one strip of pressure sensitive tape to the bottom of said insole in such a manner that the ends of said tape strip extend beyond the periphery of said insole;

pressing said insole to the bottom of said last under a force of magnitude sufficient to simultaneously cause said insole to be deformably molded to the contour of the last bottom and to press said applied tape strip midportion into adhesion with the bottom of said insole; and pressing said extending ends of said tape strip against and into adhesion with the sides of said last.

38. A shoe assembly for use in a lasting process wherein a shoe upper is last thereto comprising:

a last;

an insole located in superposed relation on the bottom of said last; and at least one strip of pressure sensitive adhesive tape, secured at its midportion to the bottom of said insole, and having its ends extending beyond the peripheral edges of said insole and being secured to the sides of said last, at least one of said ends having a non-adhesive extremity incapable of adhering to said last to thereby provide a tab for facilitating removal of said tape strip from said last and insole whereby said marginal portions of said upper may be lasted to corresponding marginal portions of said insole which are unoccupied by said tape strip whereupon said tape strip may be removed from said shoe assembly.

39. A shoe assembly as recited in claim 38 wherein said tape strip is disposed transversely of said insole and said ends thereof extend in a direction which is substantially lateral of said last and insole.

40. A shoe assembly for use in a lasting process wherein a shoe upper is lasted thereto comprising:

a last;

an insole located in superposed relation on the bottom of said last;

a first strip of pressure sensitive adhesive tape disposed transversely of and secured at its midportion to the breastline portion of said insole, and having its ends extending laterally beyond the peripheral edges of said insole and being secured to the sides of said last; and a second strip of pressure sensitive adhesive tape disposed transversely of and secured at its midportion to the ballbreak portion of said insole, and having its ends extending laterally beyond the peripheral edges of said insole and being secured to the sides of said last, at least one of said ends of each of said first and second tape strips having a non-adhesive extremity incapable of adhering to said last to thereby provide a tab for facilitating removal of said tape strip from said last and insole whereby said marginal portions of said upper may be lasted to corresponding marginal portions of said insole which are unoccupied by said tape strips whereupon said tape strips may be removed from said shoe assembly.

41. A method of fabricating a shoe comprising:

locating an insole on the bottom of a last in superposed relation thereto;

applying the midportion of at least one tape strip to the bottom of said insole in such a manner that the ends of said tape strip extend beyond the peripheral edge of said insole;

applying said extending ends of said tape strip to the sides of said last in such a manner that the extremity of at least one of said ends remains free from and unadhered to said last, thereby securing said insole to said last bottom;

draping a shoe upper about said last and insole in such a manner that a marginal portion of said upper extends beyond the bottom of said insole to form a corner portion therebetween and that each of said free, unadhered portions of said tape strip extend outwardly from said corner portion;

lasting at least certain of those parts of said marginal portion of said upper to corresponding marginal portions of said insole which are unoccupied by said tape strip; and removing said tape strip from said last and insole by gripping said free extremity of said tape strip and pulling it away from said last and insole.

42. A method of fabricating a shoe comprising:

locating an insole on the bottom of a last in superposed relation thereto;

providing a pair of adhesive tape strips having non-adhesive portions at the extreme end portions of each thereof;

applying the adhesive midportion of each of said tape strips transversely to the bottom of said insole, one of said tape strips being applied to the breastline region and the other of said tape strips being applied to the ballbreak region of said insole, with the ends of each of said tape strips extending laterally beyond the peripheral edge of said insole;

applying said extended ends of each of said tape strips to the sides of said last thereby causing the adhesive portion of each of said ends to adhere to said last;

draping a shoe upper about said last and insole in such a manner that a marginal portion of said upper extends beyond the bottom of said insole to form a corner portion therebetween and that each of said non-adhesive extreme end portions of said tape strip extends outwardly from said corner portion;

lasting the heel end and the toe end of said marginal portion of said upper to the corresponding marginal portions of said insole from the breastline region to the heel and from the ballbreak region to the toe respectively, that portion of said upper and insole that includes said tape strips remaining unlasted; and removing said tape strips from said last and insole by gripping said outwardly extending non-adhesive end portions of said tape strips and pulling them away from said last and insole.

43. A method of fabricating a shoe comprising:

locating an insole on the bottom of a last in superposed relation thereto;

placing the midportion of at least one pressure sensitive adhesive tape strip on the bottom of said insole in such a manner that the ends of said tape strip extend beyond the peripheral edge of said insole;

pressing said insole to the bottom of said last under a force sufficient to simultaneously deformably mold said insole to the contour of said last bottom and press said tape strip into adhesion with said insole;

pressing said extending ends of said tape strip to the sides of said last in such a manner that the extremity of at least one of said ends remains free from and unadhered to said last, thereby securing said insole to said last bottom;

draping a shoe upper about said last and insole in such a manner that a marginal portion of said upper extends beyond the bottom of said insole to form a corner portion therebetween and that each of said free, unadhered extremities of said tape strip extends outwardly from said corner portion;

lasting at least certain of those parts of said marginal portion of said upper to corresponding marginal portions of said insole which are unoccupied by said tape strip; and removing said tape strip from said last and insole by gripping said free extremity of said tape strip and pulling it away from said last and insole.

44. An apparatus as recited in claim 26 wherein said control means comprises:

a switch, supported on said frame and being in operative engagement with said moveable deflecting member so as to be actuable in response to said shifting movement; and means responsive to the actuation of said switch to effect said movement of the shoe manufacturing instrumentality means toward and into engagement with said last and insole.

References Cited

UNITED STATES PATENTS

| | | | |
|---|---|---|---|
| 3,107,376 | 10/1963 | Reid et al. | 12—1 |
| 3,292,191 | 12/1966 | Kamborign | 12—145 |
| 3,319,277 | 5/1967 | Batchelder et al. | 12—145 |
| 1,365,221 | 1/1921 | Blake | 12—142 |
| 2,384,003 | 9/1945 | Bazzoni | 12—33.6 |
| 2,893,026 | 7/1959 | Sillars et al. | 12—142 |

PATRICK D. LAWSON, Primary Examiner

U.S. Cl. X.R.

12—1; 156—523